US012597394B2

(12) United States Patent
Xiao et al.

(10) Patent No.: US 12,597,394 B2
(45) Date of Patent: Apr. 7, 2026

(54) PIXEL CIRCUIT HAVING CONTROL CIRCUIT FOR CONTROLLING A LIGHT EMITTING ELEMENT AND DRIVING METHOD THEREOF, DISPLAY PANEL AND DISPLAY APPARATUS

(71) Applicant: BOE TECHNOLOGY GROUP CO., LTD., Beijing (CN)

(72) Inventors: Li Xiao, Beijing (CN); Haoliang Zheng, Beijing (CN); Hao Chen, Beijing (CN); Minghua Xuan, Beijing (CN); Dongni Liu, Beijing (CN); Seungwoo Han, Beijing (CN); Liang Chen, Beijing (CN); Jiao Zhao, Beijing (CN); Xue Dong, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/824,517

(22) Filed: Sep. 4, 2024

(65) Prior Publication Data

US 2024/0428738 A1 Dec. 26, 2024

Related U.S. Application Data

(63) Continuation of application No. 18/308,385, filed on Apr. 27, 2023, now Pat. No. 12,112,707, which is a continuation of application No. 17/620,398, filed as application No. PCT/CN2020/126034 on Nov. 3, 2020, now Pat. No. 11,688,347.

(51) Int. Cl.
*G09G 3/3258* (2016.01)
*G09G 3/3291* (2016.01)

(52) U.S. Cl.
CPC ......... *G09G 3/3258* (2013.01); *G09G 3/3291* (2013.01)

(58) Field of Classification Search
CPC .................................................... G09G 3/3258
USPC ............................................................ 345/76
See application file for complete search history.

(56) References Cited

U.S. PATENT DOCUMENTS 11,688,347 B2 * 6/2023 Xiao .................... G09G 3/3291 345/76
2019/0347987 A1 * 11/2019 Zhao .................... G09G 3/3225

* cited by examiner

*Primary Examiner* — Long D Pham
(74) *Attorney, Agent, or Firm* — Dority & Manning, P.A.

(57) ABSTRACT

A pixel circuit includes a driving circuit, a first control circuit and a second control circuit. The driving circuit is configured to receive a data signal in response to a scan signal, and generate, in response to a first enable signal, a driving signal according to a first voltage and the data signal. The first control circuit is configured to: receive a first input signal in response to a first control signal, and transmit a third input signal in response to the first input signal; and receive a second input signal in response to a second control signal, and transmit a second enable signal in response to the second input signal. The second control circuit is configured to transmit the driving signal to an element to be driven in response to one of the third input signal and the second enable signal.

20 Claims, 20 Drawing Sheets

PIXEL CIRCUIT HAVING CONTROL CIRCUIT FOR CONTROLLING A LIGHT EMITTING ELEMENT AND DRIVING METHOD THEREOF, DISPLAY PANEL AND DISPLAY APPARATUS

CROSS-REFERENCE TO RELATED APPLICATIONS

This application is a continuation of U.S. Ser. No. 18/308,385, filed on Apr. 27, 2023, which is a continuation of U.S. Ser. No. 17/620,398, filed on Dec. 17, 2021, which in turn claims priority to International Patent Application No. PCT/CN2020/126034, filed on Nov. 3, 2020, which are incorporated herein by reference in their entirety.

TECHNICAL FIELD

The present disclosure relates to the field of display technologies, and in particular, to a pixel circuit and a driving method thereof, a display panel and a display apparatus.

BACKGROUND

The display market is currently booming, and as the consumer demand for various display products such as laptops, smart phones, TVs, tablets, smart watches, and fitness wristbands continues to increase, more new display products will emerge in future.

SUMMARY

In an aspect, a pixel circuit is provided. The pixel circuit includes a driving circuit, a first control circuit and a second control circuit. The driving circuit is coupled to at least a data signal terminal, a scan signal terminal, a first voltage terminal and a first enable signal terminal. The first control circuit is coupled to at least a second enable signal terminal, a first control signal terminal, a first input signal terminal, a second control signal terminal, a second input signal terminal and a third input signal terminal. The second control circuit is coupled to the driving circuit and the first control circuit, and is configured to be coupled to an element to be driven.

The driving circuit is configured to receive a data signal received at the data signal terminal in response to a scan signal received at the scan signal terminal, and generate, in response to a first enable signal received at the first enable signal terminal, a driving signal according to a first voltage at the first voltage terminal and the data signal.

The first control circuit is configured to: receive a first input signal received at the first input signal terminal in response to a first control signal received at the first control signal terminal, and transmit a third input signal received at the third input signal terminal in response to the first input signal; and receive a second input signal received at the second input signal terminal in response to a second control signal received at the second control signal terminal, and transmit a second enable signal received at the second enable signal terminal in response to the second input signal.

The second control circuit is further configured to receive one of the third input signal and the second enable signal, and transmit the driving signal from the driving circuit to the element to be driven in response to the one of the third input signal and the second enable signal, so as to control operation of the element to be driven.

In some embodiments, the first control circuit is further coupled to a third control signal terminal, the first enable signal terminal and a second voltage terminal. The first control circuit is further configured to transmit a second voltage at the second voltage terminal to the second control circuit in response to a third control signal received at the third control signal terminal; and the first control circuit being configured to transmit the third input signal in response to the first input signal includes: the first control circuit being configured to transmit the third input signal to the second control circuit in response to the first enable signal received at the first enable signal terminal and the first input signal.

In some embodiments, the first control circuit includes a first input sub-circuit. The first input sub-circuit is coupled to the first control signal terminal, the first input signal terminal and the third input signal terminal. The first input sub-circuit is configured to receive the first input signal received at the first input signal terminal in response to the first control signal received at the first control signal terminal, and transmit the third input signal received at the third input signal terminal to the second control circuit in response to the first input signal.

In some embodiments, the first input sub-circuit is further coupled to the second control circuit. The first input sub-circuit includes a first transistor, a second transistor and a first capacitor. A control electrode of the first transistor is coupled to the first control signal terminal, and a first electrode of the first transistor is coupled to the first input signal terminal. A control electrode of the second transistor is coupled to a second electrode of the first transistor, a first electrode of the second transistor is coupled to the third input signal terminal, and a second electrode of the second transistor is coupled to the second control circuit. The first capacitor is coupled to the second electrode of the first transistor.

In some embodiments, the first control circuit further includes a voltage stabilizing sub-circuit. The voltage stabilizing sub-circuit is coupled to the first enable signal terminal, the first input sub-circuit, the second control circuit, the third control signal terminal and the second voltage terminal. The voltage stabilizing sub-circuit is configured to transmit the second voltage at the second voltage terminal to the second control circuit in response to the third control signal received at the third control signal terminal, and transmit the third input signal from the first input sub-circuit to the second control circuit in response to the first enable signal received at the first enable signal terminal.

In some embodiments, the first input sub-circuit includes a third transistor, a fourth transistor and a second capacitor. A control electrode of the third transistor is coupled to the first control signal terminal, and a first electrode of the third transistor is coupled to the first input signal terminal. A control electrode of the fourth transistor is coupled to a second electrode of the third transistor, a first electrode of the fourth transistor is coupled to the third input signal terminal, and a second electrode of the fourth transistor is coupled to the voltage stabilizing sub-circuit. The second capacitor is coupled to the second electrode of the third transistor.

The voltage stabilizing sub-circuit includes a fifth transistor and a sixth transistor. A control electrode of the fifth transistor is coupled to the first enable signal terminal, a first electrode of the fifth transistor is coupled to the first input sub-circuit, and a second electrode of the fifth transistor is coupled to the second control circuit. A control electrode of the sixth transistor is coupled to the third control signal terminal, a first electrode of the sixth transistor is coupled to the second voltage terminal, and a second electrode of the sixth transistor is coupled to the second control circuit.

In some embodiments, the first control circuit further includes a second input sub-circuit. The second input sub-circuit is coupled to the second control signal terminal, the second input signal terminal, the second enable signal terminal and the second control circuit. The second input sub-circuit is configured to receive the second input signal received at the second input signal terminal in response to the second control signal received at the second control signal terminal, and transmit the second enable signal received at the second enable signal terminal to the second control circuit in response to the second input signal.

In some embodiments, the second input sub-circuit includes a seventh transistor, an eighth transistor and a third capacitor. A control electrode of the seventh transistor is coupled to the second control signal terminal, and a first electrode of the seventh transistor is coupled to the second input signal terminal. A control electrode of the eighth transistor is coupled to a second electrode of the seventh transistor, a first electrode of the eighth transistor is coupled to the second enable signal terminal, and a second electrode of the eighth transistor is coupled to the second control circuit. The third capacitor is coupled to the second electrode of the seventh transistor.

In some embodiments, the second control circuit includes a ninth transistor. A control electrode of the ninth transistor is coupled to the first control circuit, a first electrode of the ninth transistor is coupled to the driving circuit, and a second electrode of the ninth transistor is configured to be coupled to the element to be driven.

In some embodiments, the driving circuit includes a driving sub-circuit, a driving control sub-circuit, a data writing sub-circuit and a compensation sub-circuit. The driving sub-circuit includes a driving transistor and a fourth capacitor. A first terminal of the fourth capacitor is coupled to the first voltage terminal, and a second terminal of the fourth capacitor is coupled to a control electrode of the driving transistor.

The driving control sub-circuit is coupled to at least the first enable signal terminal, the first voltage terminal and the driving transistor. The data writing sub-circuit is coupled to the scan signal terminal, the data signal terminal and a first electrode of the driving transistor. The compensation sub-circuit is coupled to the scan signal terminal, the control electrode of the driving transistor and a second electrode of the driving transistor.

The driving control sub-circuit is configured to make the first voltage terminal and the second control circuit form a conductive path through the driving transistor in the driving sub-circuit in response to the first enable signal received at the first enable signal terminal. The data writing sub-circuit is configured to write the data signal received at the data signal terminal into the first electrode of the driving transistor in response to the scan signal received at the scan signal terminal. The compensation sub-circuit is configured to write the data signal and a threshold voltage of the driving transistor into the control electrode of the driving transistor in response to the scan signal received at the scan signal terminal. The driving sub-circuit is configured to generate a driving signal according to the data signal and the first voltage at the first voltage terminal.

In some embodiments, the driving control sub-circuit includes a tenth transistor. A control electrode of the tenth transistor is coupled to the first enable signal terminal, a first electrode of the tenth transistor is coupled to the first voltage terminal, and a second electrode of the tenth transistor is coupled to the first electrode of the driving transistor. The second electrode of the driving transistor is coupled to the second control circuit.

In some embodiments, the driving control sub-circuit includes a tenth transistor and an eleventh transistor. A control electrode of the tenth transistor is coupled to the first enable signal terminal, a first electrode of the tenth transistor is coupled to the first voltage terminal, and a second electrode of the tenth transistor is coupled to the first electrode of the driving transistor. A control electrode of the eleventh transistor is coupled to the first enable signal terminal, a first electrode of the eleventh transistor is coupled to the second electrode of the driving transistor, and a second electrode of the eleventh transistor is coupled to the second control circuit.

In another aspect, a display panel is provided. The display panel includes pixel circuit as described in any of the above embodiments and elements to be driven. The elements to be driven are coupled to the pixel circuits.

In some embodiments, the display panel further includes a plurality of first signal lines and a plurality of second signal lines. First control signal terminals and second control signal terminals that are coupled to a row of pixel circuits are coupled to a same first signal line, first input signal terminals and second input signal terminals that are coupled to a column of pixel circuits are coupled to two second signal lines, and the first input signal terminals and second input signal terminals are coupled to different second signal lines.

In some embodiments, first control signal terminals and second control signal terminals that are coupled to a row of pixel circuits are coupled to two first signal lines, the first control signal terminals and the second control signal terminals are coupled to different first signal lines, and first input signal terminals and second input signal terminals that are coupled to a column of pixel circuits are coupled to a same second signal line.

In some embodiments, the display panel further includes a plurality of shift register circuits connected in cascade, and each shift register circuit is coupled to third input signal terminals that are coupled to a row of pixel circuits. The shift register circuit is configured to transmit the third input signal to the third input signal terminals of the pixel circuits coupled to the shift register circuit.

In yet another aspect, a display apparatus is provided. The display apparatus includes the display panel described in any of the above embodiments and a driving chip. The driving chip is coupled to the display panel. The driving chip is configured to provide signals to the display panel.

In yet another aspect, a driving method of a pixel circuit is provided. The pixel circuit includes a driving circuit, a first control circuit and a second control circuit. The driving circuit is coupled to at least a data signal terminal, a scan signal terminal, a first voltage terminal and a first enable signal terminal. The first control circuit is coupled to at least a second enable signal terminal, a first control signal terminal, a first input signal terminal, a second control signal terminal, a second input signal terminal and a third input signal terminal. The second control circuit is coupled to the driving circuit and the first control circuit, and is configured to be coupled to an element to be driven.

The driving method includes:

receiving, by the driving circuit, a data signal received at the data signal terminal in response to a scan signal received at the scan signal terminal, and generating, by the driving circuit, a driving signal according to a first voltage at the first voltage terminal and the data signal, in response to a first enable signal received at the first enable signal terminal;

receiving, by the first control circuit, a first input signal received at the first input signal terminal in response to a first control signal received at the first control signal terminal, and transmitting, by the first control circuit, a third input signal received at the third input signal terminal in response to the first input signal; or, receiving, by the first control circuit, a second input signal received at the second input signal terminal in response to a second control signal received at the second control signal terminal, and transmitting, by the first control circuit, a second enable signal received at the second enable signal terminal in response to the second input signal; and receiving, by the second control circuit, one of the third input signal and the second enable signal, and transmitting, by the second control circuit, the driving signal from the driving circuit to the element to be driven in response to the one of the third input signal and the second enable signal, so as to control an operating duration of the element to be driven in a period in which the first enable signal is at an active level.

In the period where the first enable signal is at the active level, a sum of periods in which the third input signal is at the active level is less than a duration of the second enable signal being at the active level. A frequency of the third input signal is multiple times a frequency of the second enable signal.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art can obtain other drawings according to these drawings. In addition, the accompanying drawings in the following description may be regarded as schematic diagrams, and are not limitations on actual sizes of products, actual processes of methods and actual timings of signals involved in the embodiments of the present disclosure.

DETAILED DESCRIPTION

Figure 1:
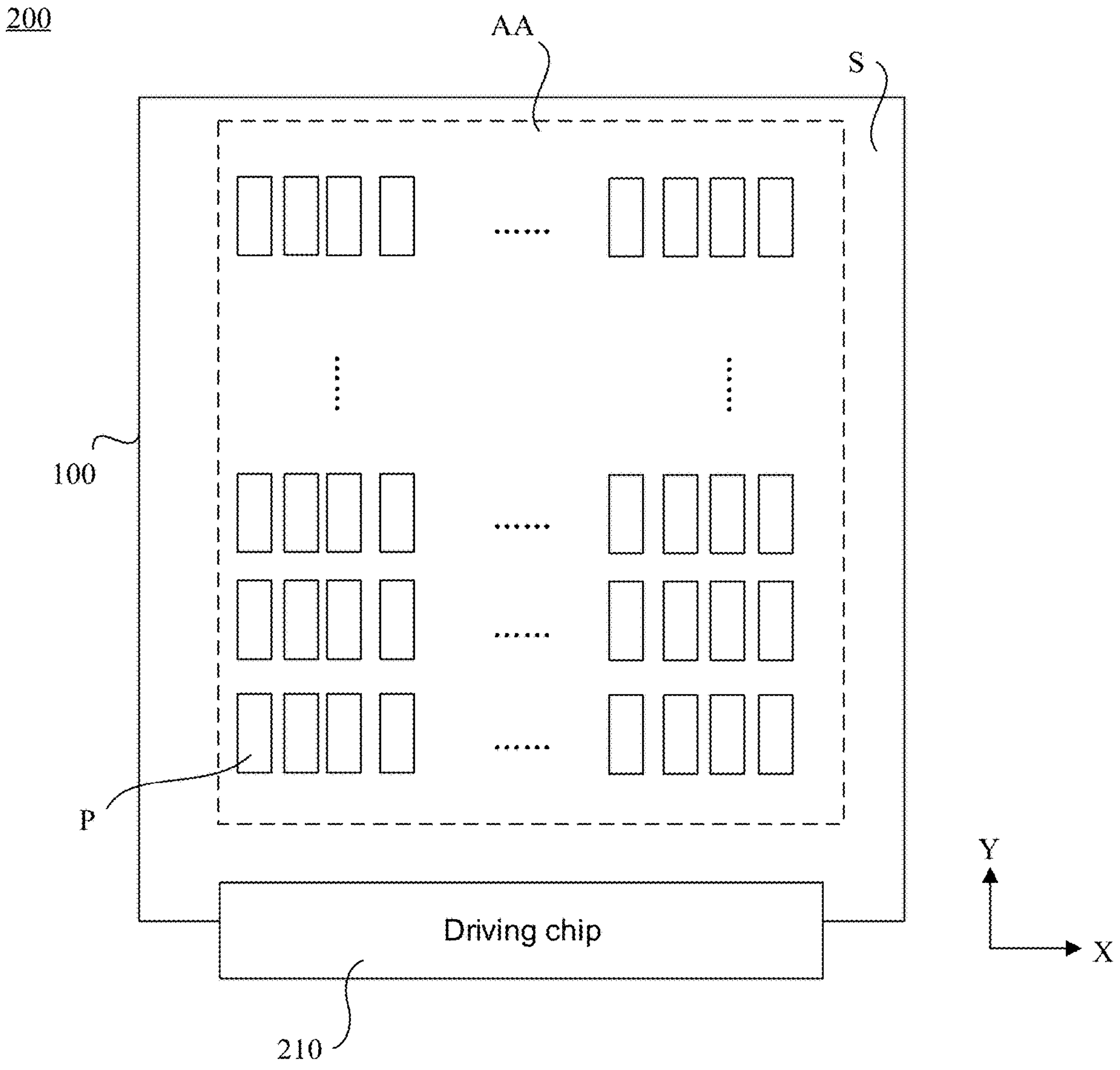
FIG. 1 is a structural diagram of a display apparatus, in accordance with some embodiments.

Technical solutions in some embodiments of the present disclosure will be described clearly and completely below with reference to the accompanying drawings. Obviously, the described embodiments are merely some but not all embodiments of the present disclosure. All other embodiments obtained on a basis of the embodiments of the present disclosure by a person of ordinary skill in the art shall be included in the protection scope of the present disclosure.

Unless the context requires otherwise, throughout the description and the claims, the term "comprise" and other forms thereof such as the third-person singular form "comprises" and the present participle form "comprising" are construed as an open and inclusive meaning, i.e., "including, but not limited to". In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics may be included in any one or more embodiments or examples in any suitable manner.

Hereinafter, the terms "first" and "second" are only used for descriptive purposes, and are not to be construed as indicating or implying relative importance or implicitly indicating the number of indicated technical features. Thus, a feature defined with "first" or "second" may explicitly or implicitly include one or more of the features. In the description of the embodiments of the present disclosure, the term "a plurality of", "the plurality of" or "multiple" means two or more unless otherwise specified.

In the description of some embodiments, the terms "coupled" and "connected" and derivatives thereof may be used. For example, the term "connect" may be used in the description of some embodiments to indicate that two or more components are in direct physical or electrical contact with each other. As another example, the term "coupled" may be used in the description of some embodiments to indicate that two or more components are in physical contact or there is an electrical signal path between the two or more components. For example, two components are connected through a signal line, or there may be other electrical elements or circuits between the two components, but there is a signal path between the two components through other electrical elements. However, the term "coupled" or "communication coupling" may also mean that two or more components are not in direct contact with each other, but yet still cooperate or interact with each other. The embodiments disclosed herein are not necessarily limited to the content herein.

The phrase "A and/or B" includes the following three combinations: only A, only B, and a combination of A and B.

As used herein, the term "if" is optionally construed to mean "when" or "in a case where" or "in response to determining" or "in response to detecting," depending on the context. Similarly, the phrase "if it is determined" or "if [a stated condition or event] is detected" is optionally construed to mean "in a case where it is determined" or "in response to determining" or "in a case where [the stated condition or event] is detected" or "in response to detecting [the stated condition or event]," depending on the context.

The use of the phrase "applicable to" or "configured to" herein means an open and inclusive expression, which does not exclude devices that are applicable to or configured to perform additional tasks or steps.

The term such as "about" or "approximately" as used herein include a stated value and an average value within an acceptable range of deviation of a particular value. The acceptable range of deviation is determined by a person of ordinary skill in the art in view of the measurement in question and the error associated with a particular amount of measurement (i.e., the limitations of the measurement system).

Self-luminous devices have attracted extensive attention due to their characteristics of high brightness and wide color gamut. However, photoelectric conversion properties (including photoelectric conversion efficiency, uniformity and color coordinates) of the self-luminous device will change as a current flowing through the self-luminous device change. For example, at a low current density, the luminous efficiency of the self-luminous device will decrease as the current density decreases, and thus the brightness uniformity of different self-luminous devices is poor. If the self-luminous device is applied to a display apparatus, a uniformity of display grayscales will be reduced, which results in disorder of the grayscales and color shift, and then affects a display effect of a display apparatus.

Embodiments of the present disclosure provide a display apparatus. For example, the display apparatus may be any apparatus that displays images whether in motion (e.g., videos) or stationary (e.g., static images), and whether literal or graphical. More specifically, the display apparatus may be one of a variety of electronic apparatuses, and the described embodiments may be implemented in or associated with the variety of electronic apparatuses, such as (but are not limited to) a mobile telephone, a wireless device, a personal data assistant (PDA), a hand-held or portable computer, a global positioning system (GPS) receiver/navigator, a camera, an MPEG-4 Part 14 (MP4) video player, a video camera, a game console, a watch, a clock, a calculator, a TV monitor, a flat-panel display, a computer monitor, a car display (e.g., an odometer display), a navigator, a cockpit controller and/or display, a camera view display (e.g., a rear view camera display in a vehicle), an electronic photo, an electronic billboard or sign, a projector, an architectural structure, a packaging and aesthetic structure (e.g., a display for an image of a piece of jewelry), etc. Embodiments of the present disclosure do not particularly limit a specific form of the display apparatus.

In some embodiments of the present disclosure, as shown in FIG. 1, the display apparatus 200 includes a display panel 100. The display panel 100 has a display area AA and a peripheral area S. The peripheral area S is located on at least a side of the display area AA.

The display panel 100 includes a plurality of sub-pixels P disposed in the display area AA. For example, the plurality of sub-pixels P may be arranged in an array. For example, sub-pixels P arranged in a line in a first direction X in FIG. 1 are referred to as sub-pixels in the same row, and sub-pixels P arranged in a line in a second direction Y in FIG. 1 are referred to as sub-pixels in the same column. The first direction X may be perpendicular to the second direction Y.

Figure 2:
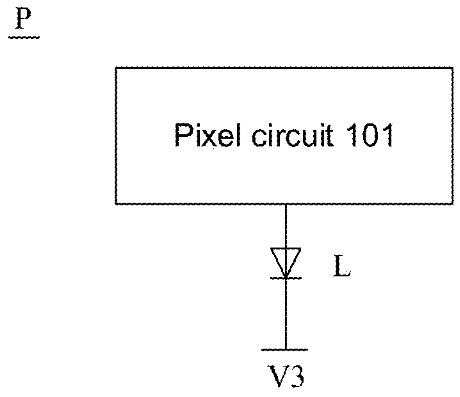
FIG. 2 is a structural diagram of a sub-pixel, in accordance with some embodiments.

In some embodiments, as shown in FIG. 2, each sub-pixel P includes a pixel circuit 101 and an element L to be driven. The pixel circuit 101 is coupled to the element L to be driven, and the pixel circuit 101 is used to provide a driving signal to the element L to be driven, so as to drive the element L to be driven to operate.

For example, a first electrode of the element L to be driven is coupled to the pixel circuit 101, and a second electrode of the element L to be driven is coupled to a third voltage terminal V3. For example, the third voltage terminal V3 is configured to transmit a third voltage, and the third voltage is a direct current (DC) voltage. For example, the third voltage is a DC low voltage. For example, the third voltage is −3 V.

For example, the element to be driven includes a current-driven type device. Further, the current-driven type device may be a current-type light-emitting diode, such as a micro light-emitting diode (micro LED), a mini light-emitting diode (mini LED), an organic light-emitting diode (OLED), or a quantum dot light-emitting diode (QLED). In this case, an operating duration of the element to be driven described herein may be understood as a light-emitting duration of the element to be driven; and an operating frequency of the element to be driven may be understood as a light-emitting frequency of the element to be driven. For example, the first electrode and the second electrode of the element to be driven are an anode and a cathode of the light-emitting diode, respectively.

In a case where the element to be driven emits light, since a brightness presented by the element to be driven when emitting light is related to the light-emitting duration and a driving current of the element to be driven, the brightness of the element to be driven may be controlled by adjusting the light-emitting duration and/or the driving current of the element to be driven. For example, if driving currents of two elements to be driven are the same, and light-emitting durations thereof are different, display brightnesses of the two elements to be driven are different; if driving currents of two elements to be driven are different, and light-emitting durations thereof are the same, display brightnesses of the two elements to be driven are also different; and if driving currents and light-emitting durations of two elements to be driven are both not the same, whether display brightnesses of the two elements to be driven are the same needs to be analyzed concretely.

The display panel further includes a base substrate, and the pixel circuit and the element to be driven are both located on the base substrate. For example, the base substrate may include a rigid base (or referred to as a hard base) such as glass, or a flexible base such as polyimide (PI); and may further include a thin film such as a buffer layer disposed on the rigid base or the flexible base.

Figure 3:
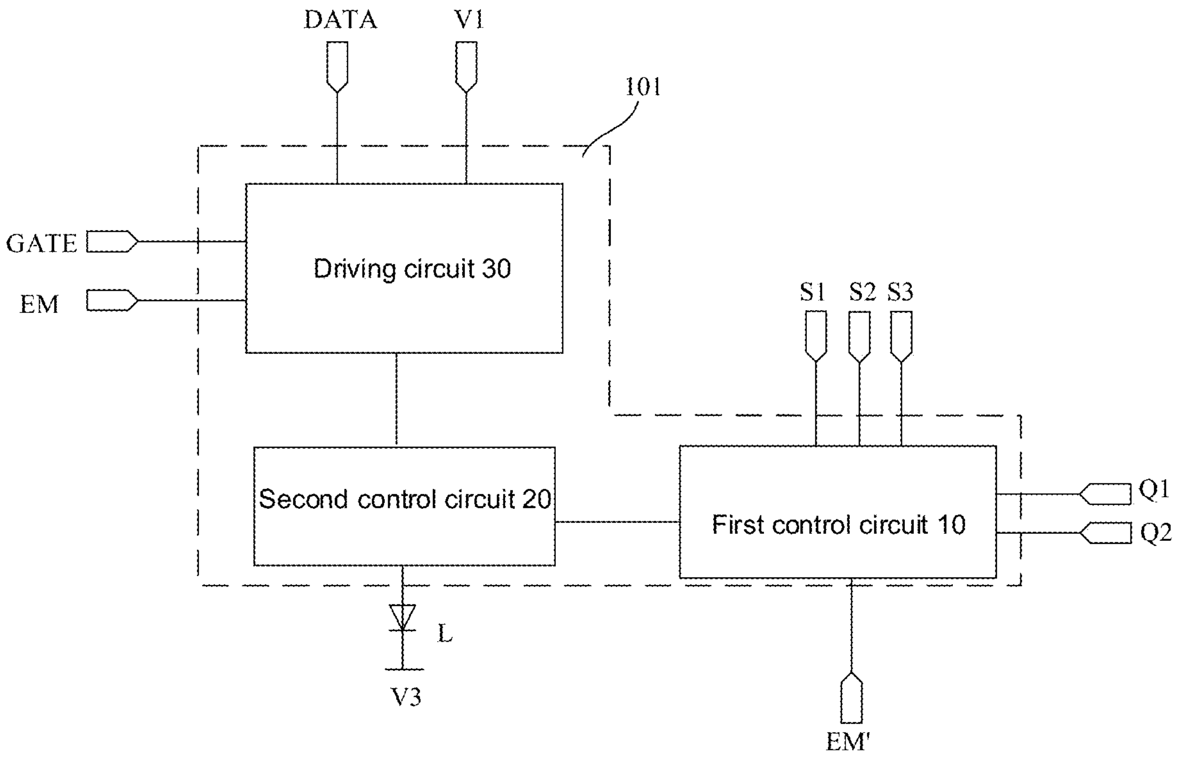
FIG. 3 is a structural diagram of a pixel circuit, in accordance with some embodiments.

Some embodiments of the present disclosure provide a pixel circuit. As shown in FIG. 3, the pixel circuit 101 includes a first control circuit 10, a second control circuit 20, and a driving circuit 30.

The driving circuit 30 is coupled to at least a data signal terminal DATA, a scan signal terminal GATE, a first voltage terminal V1, and a first enable signal terminal EM.

The first control circuit 10 is coupled to at least a second enable signal terminal EM', a first control signal terminal Q1, a first input signal terminal S1, a second control signal terminal Q2, a second input signal terminal S2, and a third input signal terminal S3.

The second control circuit 20 is coupled to the driving circuit 30, the first control circuit 10, and the element L to be driven.

The driving circuit 30 is configured to: receive a data signal received at the data signal terminal DATA, in response to a scan signal received at the scan signal terminal GATE; and generate a driving signal according to a first voltage at the first voltage terminal V1 and the data signal, in response to a first enable signal received at the first enable signal terminal EM.

The first control circuit 10 is configured to: receive a first input signal received at the first input signal terminal S1, in response to a first control signal received at the first control signal terminal Q1; and transmit a third input signal received at the third input signal terminal S3, in response to the first input signal. The first control circuit 10 is further configured to: receive a second input signal received at the second input signal terminal S2, in response to a second control signal received at the second control signal terminal Q2; and transmit a second enable signal received at the second enable signal terminal EM', in response to the second input signal.

The second control circuit 20 is configured to receive one of the third input signal and the second enable signal, and transmit the driving signal from the driving circuit 30 to the element L to be driven in response to the one of the third input signal and the second enable signal, so as to control the operating duration of the element L to be driven.

It will be noted that, in an image frame, a period in which the first enable signal is at an active level is considered to be an operating period (e.g., a third period in the image frame described below) of the element to be driven. It can be understood that, in the operating period of the element to be driven, there is a case where a driving signal cannot make the element to be driven to be operate. For example, in a case where the element to be driven is a light-emitting diode (LED), and a driving signal received by the element to be driven cannot make the element to be driven to be lit, the element to be driven displays zero grayscale. In the case where the element to be driven is the LED, the operating frequency described in the embodiments refers to the light-emitting frequency of the element to be driven in the operating period, and the operating duration described in the embodiments refers to the light-emitting duration of the element to be driven in the operating period.

For example, the first voltage received at the first voltage terminal is a DC voltage, e.g., a DC high voltage. For example, the first voltage is 7 V. For example, in a case where the first voltage received at the first voltage terminal is a high voltage, the third voltage received at the third voltage terminal is a low voltage; alternatively, in a case where the first voltage received at the first voltage terminal is a low voltage, the third voltage received at the third voltage terminal is a high voltage.

For example, the second enable signal terminal and the first enable signal terminal are coupled to a same signal line; and the second enable signal is the same as the first enable signal. In this way, in the period in which the first enable signal is at the active level in the image frame, a duration of the second enable signal being at an active level is equal to a duration of the first enable signal being at the active level.

For another example, the second enable signal terminal and the first enable signal terminal are different signal terminals. In a case where the sub-pixel where the pixel circuit is located displays a medium or high grayscale, the second enable signal is the same as the first enable signal. In a case where the sub-pixel where the pixel circuit is located displays a medium grayscale, an amplitude of the driving signal is maintained within a relatively high value range, and thus the duration of the second enable signal being at the active level is controlled to be less than the duration of the first enable signal being at the active level.

For example, the third input signal received at the third input signal terminal is a pulse signal. That is, in an image frame, the third input signal has a plurality of pulses. For example, a frequency of the third input signal is greater than a frequency of the second enable signal. That is, in unit time, the number of periods in which the second enable signal is at the active level is less than the number of periods in which the third input signal is at an active level. For example, in the period where the first enable signal is at the active level in the image frame, a sum of periods in which the third input signal is at the active level is less than the duration of the second enable signal being at the active level.

For example, the third input signal is a high frequency pulse signal. For example, the frequency of the third input signal is in a range from 3000 Hz to 60000 Hz, such as 3000 Hz or 60000 Hz. For example, frequencies of the first enable signal and the second enable signal are in a range from 60 Hz to 120 Hz, such as 60 Hz or 120 Hz. For example, a frame frequency of the display panel is 60 Hz (that is, the display panel may display 60 frames of images within 1 second), and a display duration of each image frame is equal. In this way, in a case where the third input signal is the high-frequency signal with a frequency of 3000 Hz, in one image frame, if the element to be driven is to present a brightness of a low grayscale, the element to be driven may receive approximately 50 active periods of the high-frequency signal in a light-emitting period.

For example, in the case where the sub-pixel where the pixel circuit is located displays the medium or high grayscale, the first input signal is at a high level (inactive level) during an active period of the first control signal received at the first control signal terminal Q1, and the second input signal is at a low level (active level) during an active period of the second control signal received at the second control signal terminal Q2. In the case where the sub-pixel where the pixel circuit is located displays the low grayscale, the first input signal is at a low level (active level) during the active period of the first control signal received at the first control signal terminal Q1, and the second input signal is at a high level (inactive level) during the active period of the second control signal received at the second control signal terminal Q2.

The first control circuit will not simultaneously transmit the second enable signal and the third input signal to the second control circuit. For example, in the case where the sub-pixel where the pixel circuit is located displays the medium or high grayscale, the first control circuit transmits the second enable signal to the second control circuit; and in the case where the sub-pixel where the pixel circuit is located displays the low grayscale, the first control circuit transmits the third input signal to the second control circuit.

In a case where the element to be driven displays different grayscales, by controlling the first control circuit to transmit the second enable signal or the third input signal to the second control circuit, a turn-on frequency of the second control circuit is controlled, a frequency at which the driving circuit and the element to be driven form a conductive path is controlled, and then a frequency at which the driving signal is transmitted to the element to be driven may be controlled. The frequency at which the conductive path is formed determines a total operating duration of the element to be driven, and in the image frame, the total operating duration of the element to be driven is a sum of operating sub-durations of the element to be driven when the conductive path is formed multiple times. In this way, a luminous intensity of the element to be driven may be controlled by controlling the amplitude of the driving signal and the frequency at which the driving signal is transmitted to the element to be driven, thereby realizing a corresponding grayscale display.

It will be understood that, a range of the amplitude of the driving signal should be a range where the luminous efficiency of the element to be driven is high and stable, the color coordinate of the element to be driven is good, and a dominant wavelength of light exiting from the element to be driven is stable. For example, a range of the amplitude of the driving signal may be a range where the amplitude of the driving signal is relatively large. Therefore, the data signal provided by the data signal terminal when the element to be driven displays the medium or high grayscale may have a same value range as the data signal provided by the data signal terminal when the element to be driven displays the low grayscale.

In the case where the sub-pixel where the pixel circuit is located displays the medium or high grayscale, the first control circuit transmits the second enable signal to the second control circuit. In the light-emitting period of the element to be driven in the sub-pixel, the second control circuit is in a turn-on state all the time in response to the second enable signal, so that the driving circuit and the element to be driven form the conductive path all the time, and the driving signal is continuously transmitted to the element to be driven. Since the amplitude of the driving signal corresponding to the medium or high grayscale is relatively high, the element to be driven may operate under the driving signal with a relatively high amplitude, thereby ensuring the operating efficiency (luminous efficiency) of the element to be driven.

In the case where the sub-pixel where the pixel circuit is located displays the low grayscale, the first control circuit transmits the third input signal to the second control circuit; and in the light-emitting period of the element to be driven in the sub-pixel, the second control circuit is in turn-on and turn-off states alternately in response to the third input signal with high-frequency pulses, so that the driving signal is intermittently transmitted to the element to be driven, and correspondingly, the element to be driven periodically receives the driving signal. For example, the element to be driven stops receiving the driving signal for a period of time after receiving the driving signal for a period of time, then receives the driving signal for a period of time, and then stops receiving the driving signal for a period of time. In this way, a duration of the driving circuit and the element to be driven forming the conductive path is shortened, and a duration of the driving signal being transmitted to the element to be driven is shortened. Therefore, in the case where the sub-pixel where the pixel circuit is located displays the low grayscale, the amplitude of the driving signal may be maintained in a relatively high value range or at a relatively large fixed value, and the sub-pixel achieves a corresponding low grayscale display by changing the operating duration of the element to be driven. As a result, it improves the operating efficiency of the element to be driven, avoid problems of low operating efficiency and high power consumption of the element to be driven in a case where the low grayscale is displayed under a low current amplitude, avoid reduction in the uniformity of the displayed grayscales, and avoid occurrence of a color shift of the display. Thus, the display effect of the display panel is improved.

For example, the amplitude of the driving signal is related to the data signal received at the data signal terminal, and the data signal may be a signal that enables the element to be driven to have a relatively high operating efficiency. For example, the data signal may be a signal that changes in a relatively high amplitude range or a signal with a relatively high fixed amplitude. In this case, in the pixel circuit, the driving circuit controls an amplitude range of the driving signal, and the first control circuit and the second control circuit control the duration of the driving signal being transmitted to the element to be driven and the frequency at which the driving signal is transmitted to the element to be driven, so that the grayscale display corresponding to the sub-pixel is controlled.

Moreover, in an image frame, in a case where the sub-pixel displays the low grayscale, compared with a situation where the element to be driven does not operate for a long time after operating for a short time, which results in that human eyes will obviously view flicker, in the embodiments of the present disclosure, the element to be driven is intermittently in the operating state, so that the operating states and non-operating states of the element to be driven alternate with a relatively large alternating frequency (that is, a brightness-darkness alternating frequency of the element to be driven is high), thereby being not easy to view the flicker by human eyes. As a result, the display effect is improved.

Therefore, in the pixel circuit provided in the embodiments of the present disclosure, the driving circuit generates the driving signal according to the first voltage and the written data signal. The first control circuit receives the first input signal in response to the first control signal, and transmits the third input signal in response to the first input signal; the first control circuit receives the second input signal in response to the second control signal, and transmits the second enable signal in response to the second input signal; and the second control circuit transmits the received driving signal from the driving circuit to the element to be driven in response to the received signal from the first control circuit, and controls the operating duration of the element to be driven. In this case, when the element to be driven displays different grayscales, in the case where the sub-pixel where the pixel circuit is located displays the medium or high grayscale, the first control circuit transmits the second enable signal to the second control circuit, so that the element to be driven always operates under the driving signal with a relatively high amplitude, which ensures the operating efficiency of the element to be driven; and in the case where the sub-pixel where the pixel circuit is located displays the low grayscale, the first control circuit transmits the third input signal to the second control circuit so that the element to be driven is intermittently in the operating state, and by controlling the operating duration of the element to be driven, the element to be driven may also achieve a corresponding grayscale display under the driving signal with a relatively high amplitude, which improves the operating efficiency of the element to be driven. In addition, the operating frequency of the element to be driven is relatively high, which may prevent human eyes from viewing the flicker, and thus the display effect is improved.

For example, as shown in FIGS. 6A to 6D, the second control circuit 20 includes a ninth transistor T9. A control electrode of the ninth transistor T9 is coupled to the first control circuit 10, a first electrode of the ninth transistor T9 is coupled to the driving circuit 30, and a second electrode of the ninth transistor T9 is coupled to the element L to be driven.

Figure 5A:
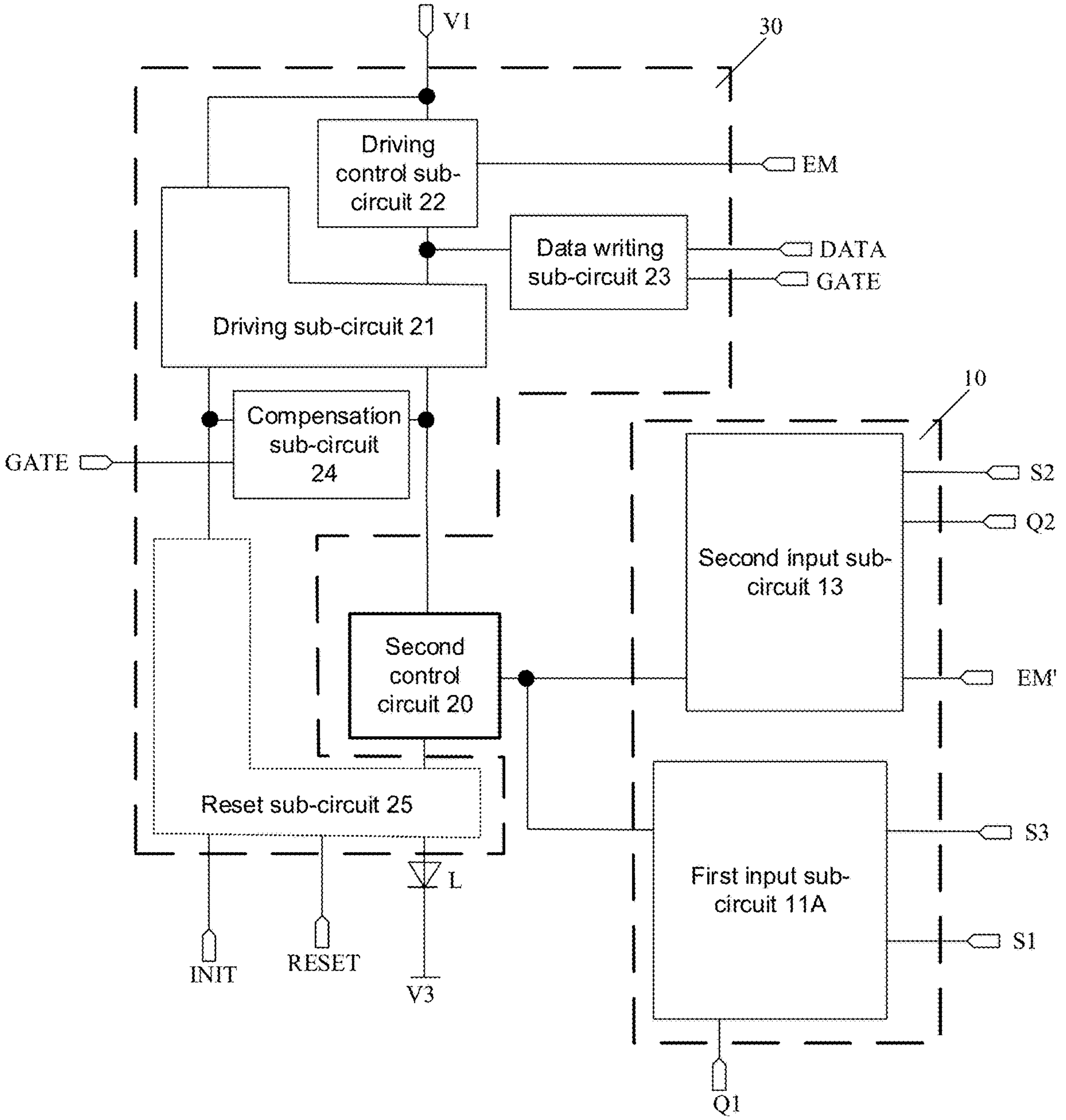
FIG. 5A is a structural diagram of yet another pixel circuit, in accordance with some embodiments.

In some embodiments, as shown in FIG. 5A, the first control circuit 10 includes a first input sub-circuit 11A. The first input sub-circuit 11A is coupled to the first control signal terminal Q1, the first input signal terminal S1 and the third input signal terminal S3. The first input sub-circuit 11A is further coupled to the second control circuit 20.

The first input sub-circuit 11A is configured to receive the first input signal received at the first input signal terminal S1 in response to the first control signal received at the first control signal terminal Q1, and transmit the third input signal received at the third input signal terminal S3 to the second control circuit 20 in response to the first input signal.

Figure 6A:
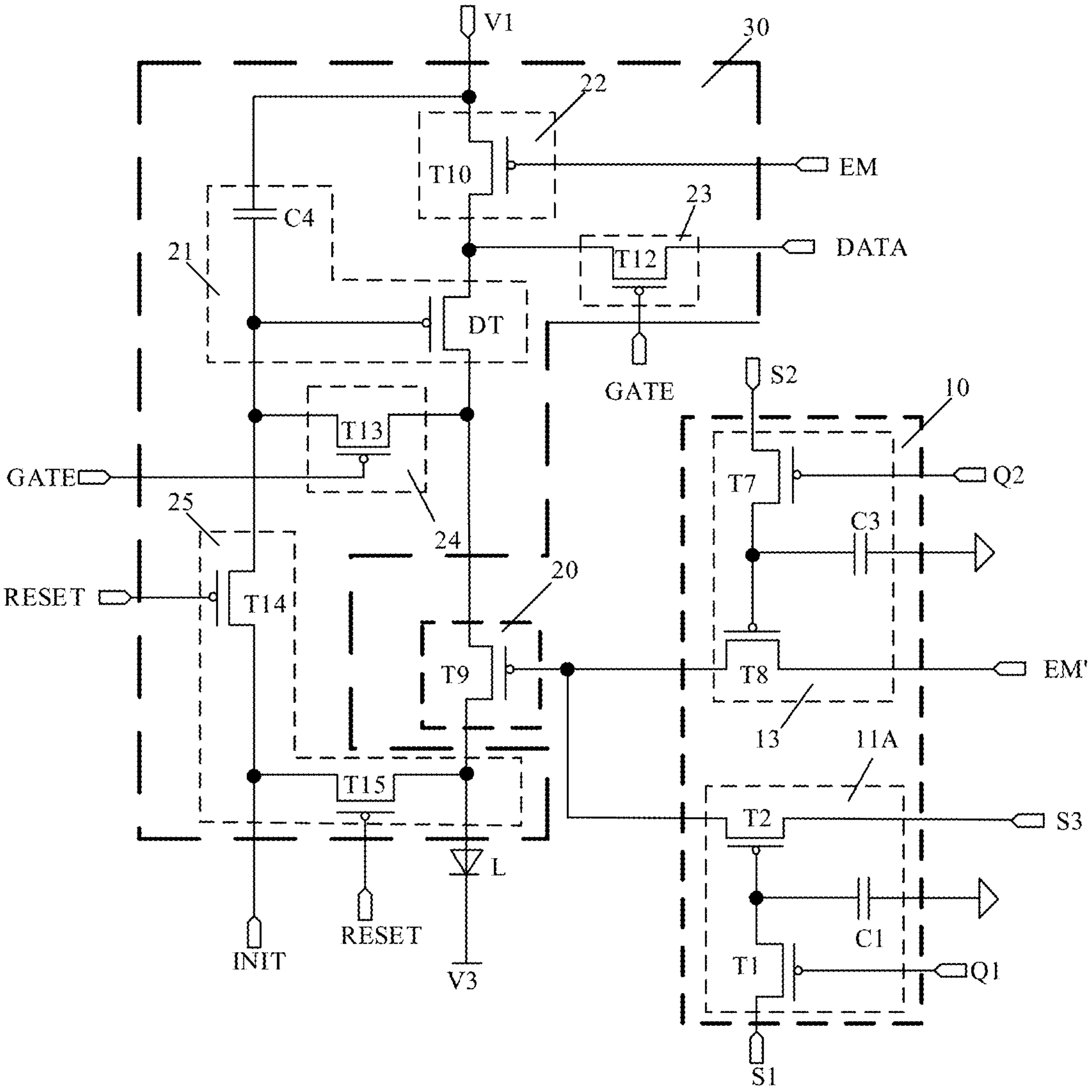
FIG. 6A is a structural diagram of yet another pixel circuit, in accordance with some embodiments.

For example, as shown in FIG. 6A, the first input sub-circuit 11A includes a first transistor T1, a second transistor T2 and a first capacitor C1.

A control electrode of the first transistor T1 is coupled to the first control signal terminal Q1, and a first electrode of the first transistor T1 is coupled to the first input signal terminal S1.

A control electrode of the second transistor T2 is coupled to a second electrode of the first transistor T1, a first electrode of the second transistor T2 is coupled to the third input signal terminal S3, and a second electrode of the second transistor T2 is coupled to the second control circuit 20.

For example, as shown in FIG. 6A, in the case where the second control circuit 20 includes the ninth transistor T9, the second electrode of the second transistor T2 is coupled to the control electrode of the ninth transistor T9.

The first capacitor C1 is coupled to the second electrode of the first transistor T1. For example, a first terminal of the first capacitor C1 is coupled to the second electrode of the first transistor T1, and a second terminal of the first capacitor C1 is coupled to a fixed voltage terminal.

For example, the fixed voltage terminal is configured to transmit a fixed voltage signal, such as a DC voltage signal. For example, the fixed voltage signal is a ground signal, or the fixed voltage signal is approximately a ground signal. For example, the fixed voltage terminal may be a ground terminal.

It will be understood that, the first capacitor in the first input sub-circuit may store the written first input signal, so as to control a voltage of the control electrode of the second transistor to be a voltage of the first input signal.

Figure 4:
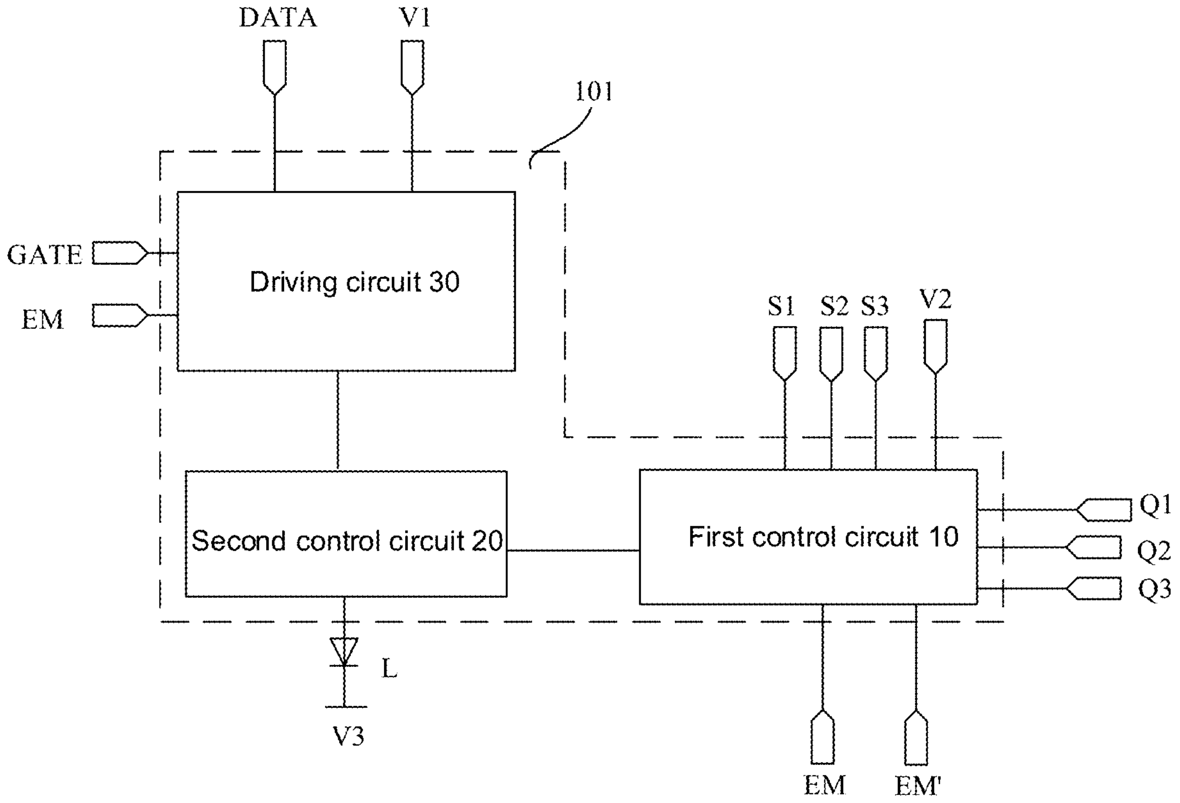
FIG. 4 is a structural diagram of another pixel circuit, in accordance with some embodiments.

In some embodiments, as shown in FIG. 4, the first control circuit 10 is further coupled to a third control signal terminal Q3, the first enable signal terminal EM, and a second voltage terminal V2.

The first control circuit 10 is further configured to transmit a second voltage at the second voltage terminal V2 to the second control circuit 20, in response to a third control signal received at the third control signal terminal Q3. The first control circuit 10 being configured to transmit the third input signal in response to the first input signal includes: the first control circuit 10 being configured to transmit the third input signal to the second control circuit 20, in response to the first enable signal received at the first enable signal terminal EM and the first input signal.

For example, the second voltage received at the second voltage terminal is a DC voltage, such as a DC high voltage.

In this case, the first control circuit 10 may further transmit the second voltage to the second control circuit 20, so as to control the second control circuit 20 to receive the DC voltage. In a period in which the sub-pixel does not emit light, it is possible to avoid an influence on voltage stability of an element in the second control circuit 20 in a case where the third input signal is the pulse signal.

Figure 5B:
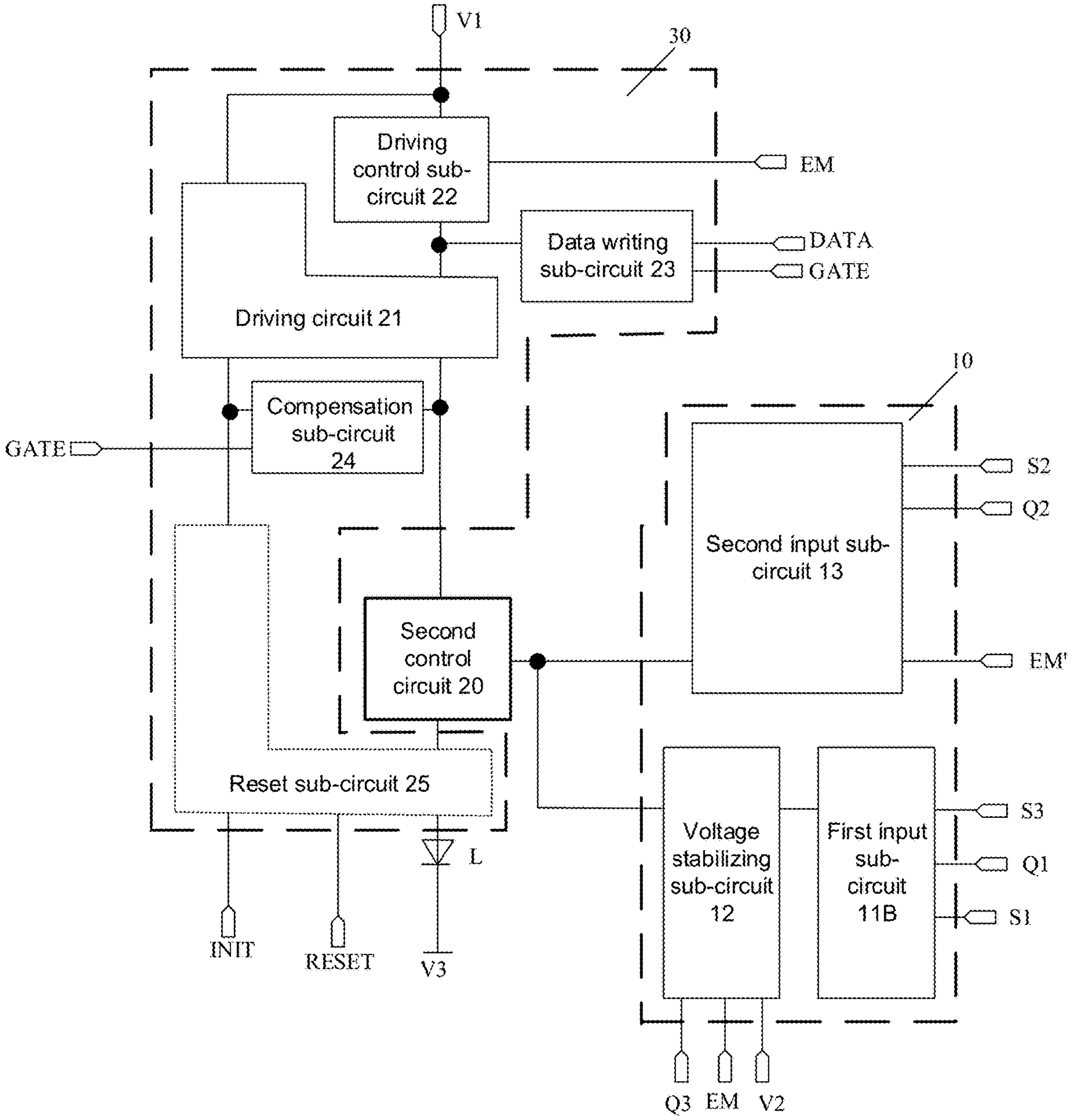
FIG. 5B is a structural diagram of yet another pixel circuit, in accordance with some embodiments.

In some embodiments, as shown in FIG. 5B, the first control circuit 10 includes a first input sub-circuit 11B and a voltage stabilizing sub-circuit 12.

The first input sub-circuit 11B is coupled to the first control signal terminal Q1, the first input signal terminal S1, the third input signal terminal S3 and the voltage stabilizing sub-circuit 12. The first input sub-circuit 11B is configured to receive the first input signal received at the first input signal terminal S1 in response to the first control signal received at the first control signal terminal Q1, and transmit the third input signal received at the third input signal terminal S3 to the voltage stabilizing sub-circuit 12 in response to the first input signal.

The voltage stabilizing sub-circuit 12 is coupled to the first input sub-circuit 11B, the first enable signal terminal EM, the third control signal terminal Q3, the second voltage terminal V2 and the second control circuit 20. In the case where the second control circuit 20 includes the ninth transistor T9, as shown in FIG. 6B, the voltage stabilizing sub-circuit 12 is coupled to the control electrode of the ninth transistor T9.

The voltage stabilizing sub-circuit 12 is configured to transmit the second voltage at the second voltage terminal V2 to the second control circuit 20 in response to the third control signal received at the third control signal terminal Q3, and transmit the third input signal output from the first input sub-circuit 11B to the second control circuit 20 in response to the first enable signal received at the first enable signal terminal EM.

In this case, the voltage stabilizing sub-circuit 12 transmits the third input signal to the second control circuit 20 in a case where the first enable signal is at the active level. In this way, in a period in which the first enable signal is at an inactive level, the third input signal will not be transmitted to the second control circuit 20. Therefore, it may improve a stability of a voltage of the second control circuit 20, e.g., a voltage of the control electrode of the ninth transistor T9 in the second control circuit 20. Moreover, in the period in which the first enable signal is at the inactive level, the voltage stabilizing sub-circuit 12 transmits the second voltage to the second control circuit 20, so that the second control circuit 20 receives a stable voltage, and then the voltage of the control electrode of the ninth transistor T9 is stable, which ensures the voltage stability of the second control circuit 20.

Figure 6B:
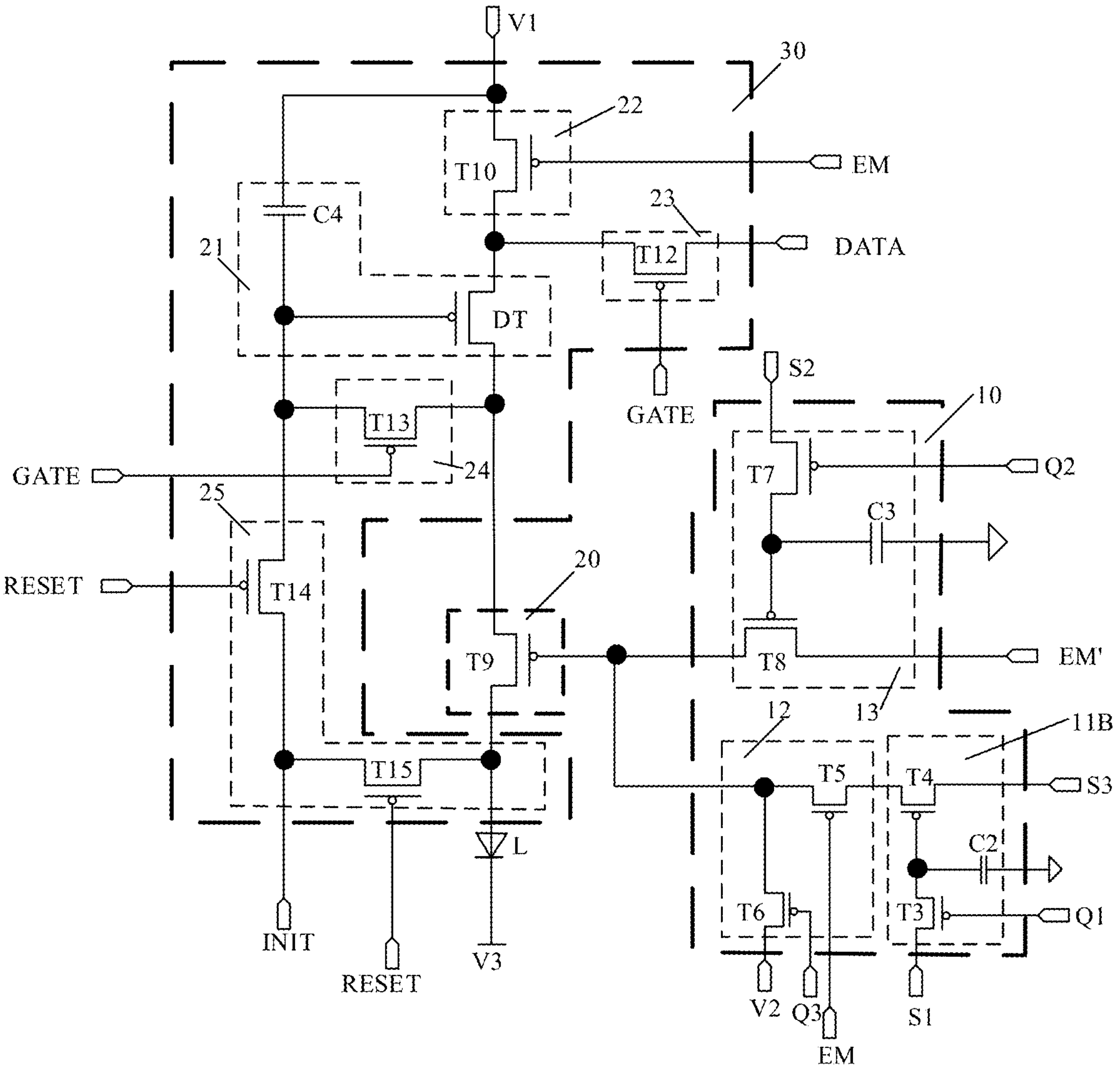
FIG. 6B is a structural diagram of yet another pixel circuit, in accordance with some embodiments.

For example, as shown in FIG. 6B, the first input sub-circuit 11B includes a third transistor T3, a fourth transistor T4, and a second capacitor C2.

A control electrode of the third transistor T3 is coupled to the first control signal terminal Q1, and a first electrode of the third transistor T3 is coupled to the first input signal terminal S1.

A control electrode of the fourth transistor T4 is coupled to the second electrode of the third transistor T3, a first electrode of the fourth transistor T4 is coupled to the third input signal terminal S3, and a second electrode of the fourth transistor T4 is coupled to the voltage stabilizing sub-circuit 12.

The second capacitor C2 is coupled to the second electrode of the third transistor T3. For example, a first terminal of the second capacitor C2 is coupled to the second electrode of the third transistor T3, and a second terminal of the second capacitor C2 is coupled to a fixed voltage terminal.

For example, the fixed voltage terminal is configured to transmit a fixed voltage signal. For example, the fixed voltage signal includes a DC voltage signal. For example, the fixed voltage signal is a ground signal, or the fixed voltage signal is approximately a ground signal. For example, the fixed voltage terminal may be the ground terminal.

It will be understood that, the second capacitor C2 in the first input sub-circuit 11B may store the written first input signal, so as to control a voltage of the control electrode of the fourth transistor to be the voltage of the first input signal.

The voltage stabilizing sub-circuit 12 includes a fifth transistor T5 and a sixth transistor T6.

A control electrode of the fifth transistor T5 is coupled to the first enable signal terminal EM, a first electrode of the fifth transistor T5 is coupled to the first input sub-circuit 11B, and a second electrode of the fifth transistor T5 is coupled to the second control circuit 20. In the case where the first input sub-circuit 11B includes the fourth transistor T4, the first electrode of the fifth transistor T5 is coupled to the second electrode of the fourth transistor T4. In the case where the second control circuit 20 includes the ninth transistor T9, the second electrode of the fifth transistor T5 is coupled to the control electrode of the ninth transistor T9.

A control electrode of the sixth transistor T6 is coupled to the third control signal terminal Q3, a first electrode of the sixth transistor T6 is coupled to the second voltage terminal V2, and a second electrode of the sixth transistor T6 is coupled to the second control circuit 20. In the case where the second control circuit 20 includes the ninth transistor T9, the second electrode of the sixth transistor T6 is coupled to the control electrode of the ninth transistor T9.

In some embodiments, as shown in FIGS. 5A and 5B, the first control circuit 10 further includes a second input sub-circuit 13.

The second input sub-circuit 13 is coupled to the second control signal terminal Q2, the second input signal terminal S2, the second enable signal terminal EM' and the second control circuit 20. In the case where the second control circuit 20 includes the ninth transistor T9, the second input sub-circuit 13 is coupled to the control electrode of the ninth transistor T9.

The second input sub-circuit 13 is configured to receive the second input signal received at the second input signal terminal S2 in response to the second control signal received at the second control signal terminal Q2, and transmit the second enable signal received at the second enable signal terminal EM' to the second control circuit 20 in response to the second input signal.

For example, as shown in FIGS. 6A to 6D, the second input sub-circuit 13 includes a seventh transistor T7, an eighth transistor T8 and a third capacitor C3.

A control electrode of the seventh transistor T7 is coupled to the second control signal terminal Q2, and a first electrode of the seventh transistor T7 is coupled to the second input signal terminal S2.

A control electrode of the eighth transistor T8 is coupled to a second electrode of the seventh transistor T7, a first electrode of the eighth transistor T8 is coupled to the second enable signal terminal EM', and a second electrode of the eighth transistor T8 is coupled to the second control circuit 20.

The third capacitor C3 is coupled to the second electrode of the seventh transistor T7. For example, a first terminal of the third capacitor C3 is coupled to the second electrode of the seventh transistor T7, and a second terminal of the third capacitor C3 is coupled to a fixed voltage terminal.

For example, the fixed voltage terminal is configured to transmit a fixed voltage signal. For example, the fixed voltage signal includes a DC voltage signal. For example, the fixed voltage signal is a ground signal, or the fixed voltage signal is approximately a ground signal. For example, the fixed voltage terminal may be the ground terminal.

It will be understood that, the third capacitor C3 in the second input sub-circuit 13 may store the written second input signal, so as to control a voltage of the control electrode of the eighth transistor to be a voltage of the second input signal.

In the case where the second control circuit 20 includes the ninth transistor T9, the second electrode of the eighth transistor T8 is coupled to the control electrode of the ninth transistor T9.

In some embodiments, as shown in FIGS. 5A and 5B, the driving circuit 30 includes a driving sub-circuit 21, a driving control sub-circuit 22, a data writing sub-circuit 23 and a compensation sub-circuit 24.

As shown in FIGS. 6A to 6D, the driving sub-circuit 21 includes a driving transistor DT and a fourth capacitor C4. A first terminal of the fourth capacitor C4 is coupled to the first voltage terminal V1, and a second terminal of the fourth capacitor C4 is coupled to a control electrode of the driving transistor DT.

The data writing sub-circuit 23 is coupled to the scan signal terminal GATE, the data signal terminal DATA and a first electrode of the driving transistor DT in the driving sub-circuit 21. The compensation sub-circuit 24 is coupled to the scan signal terminal GATE, the control electrode of the driving transistor DT, and a second electrode of the driving transistor DT. The driving control sub-circuit 24 is coupled to at least the first enable signal terminal EM, the first voltage terminal V1 and the driving transistor DT in the driving sub-circuit 21.

The data writing sub-circuit 23 is configured to write the data signal received at the data signal terminal DATA into the first electrode of the driving transistor DT in the driving sub-circuit 21, in response to the scan signal received at the scan signal terminal GATE.

The driving sub-circuit 21 is configured to generate a driving signal according to the written data signal and the first voltage at the first voltage terminal V1.

The driving control sub-circuit 22 is configured to make the first voltage terminal V1 and the second control circuit

20 form a conductive path through the driving transistor DT in the driving sub-circuit 21, in response to the first enable signal received at the first enable signal terminal EM.

The compensation sub-circuit 24 is configured to write the data signal and a threshold voltage of the driving transistor DT into the control electrode of the driving transistor DT, in response to the scan signal received at the scan signal terminal GATE. In this way, it may avoid an influence of the threshold voltage of the driving transistor DT on the driving signal.

For example, as shown in FIGS. 6A and 6B, the driving control sub-circuit 22 includes a tenth transistor T10.

A control electrode of the tenth transistor T10 is coupled to the first enable signal terminal EM, a first electrode of the tenth transistor T10 is coupled to the first voltage terminal V1, and a second electrode of the tenth transistor T10 is coupled to a first electrode of the driving transistor DT.

The second electrode of the driving transistor DT is coupled to the second control circuit 20. In the case where the second control circuit 20 includes the ninth transistor T9, the second electrode of the driving transistor DT is coupled to the first electrode of the ninth transistor T9.

Figure 6C:
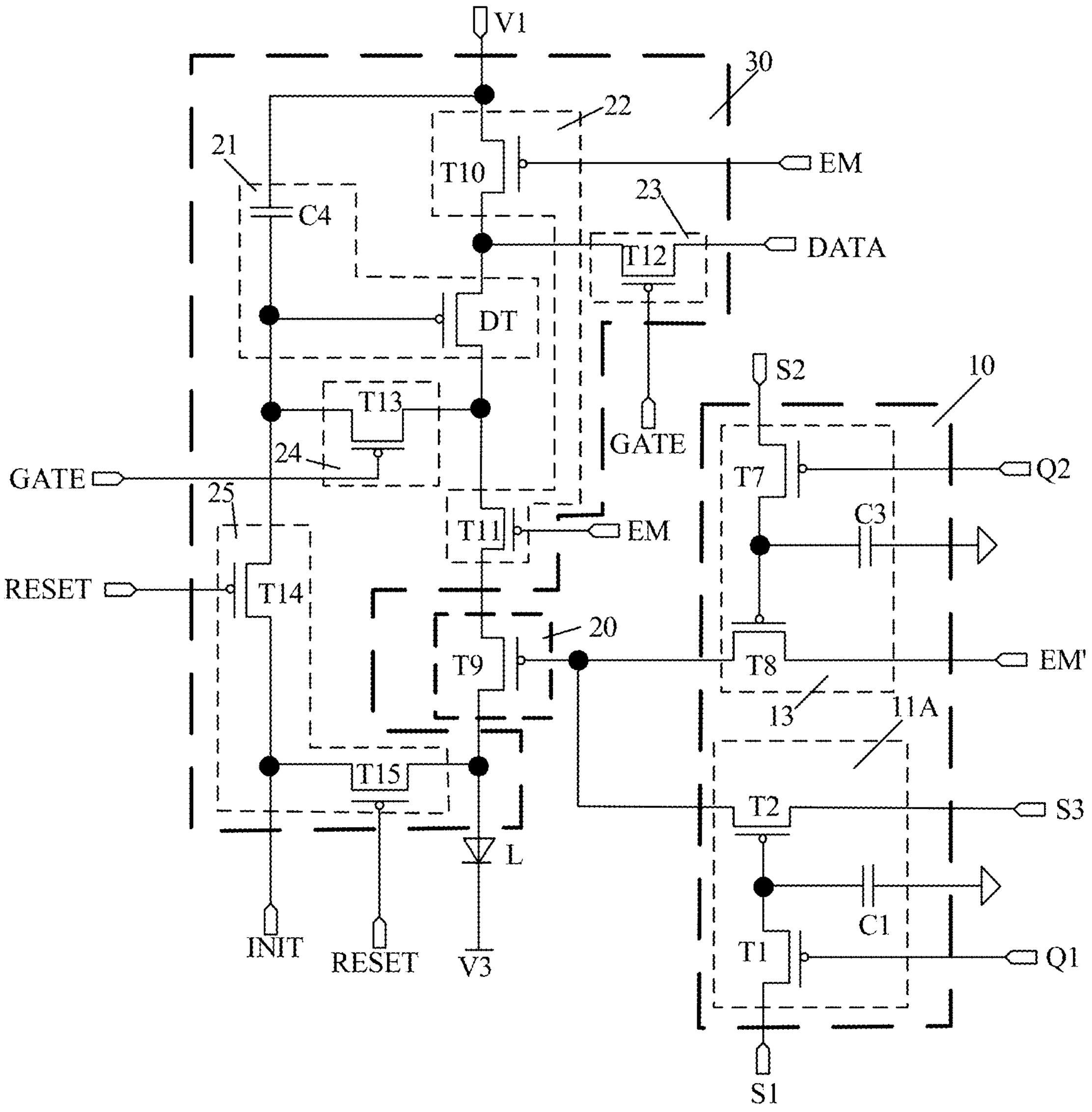
FIG. 6C is a structural diagram of yet another pixel circuit, in accordance with some embodiments.
Figure 6D:
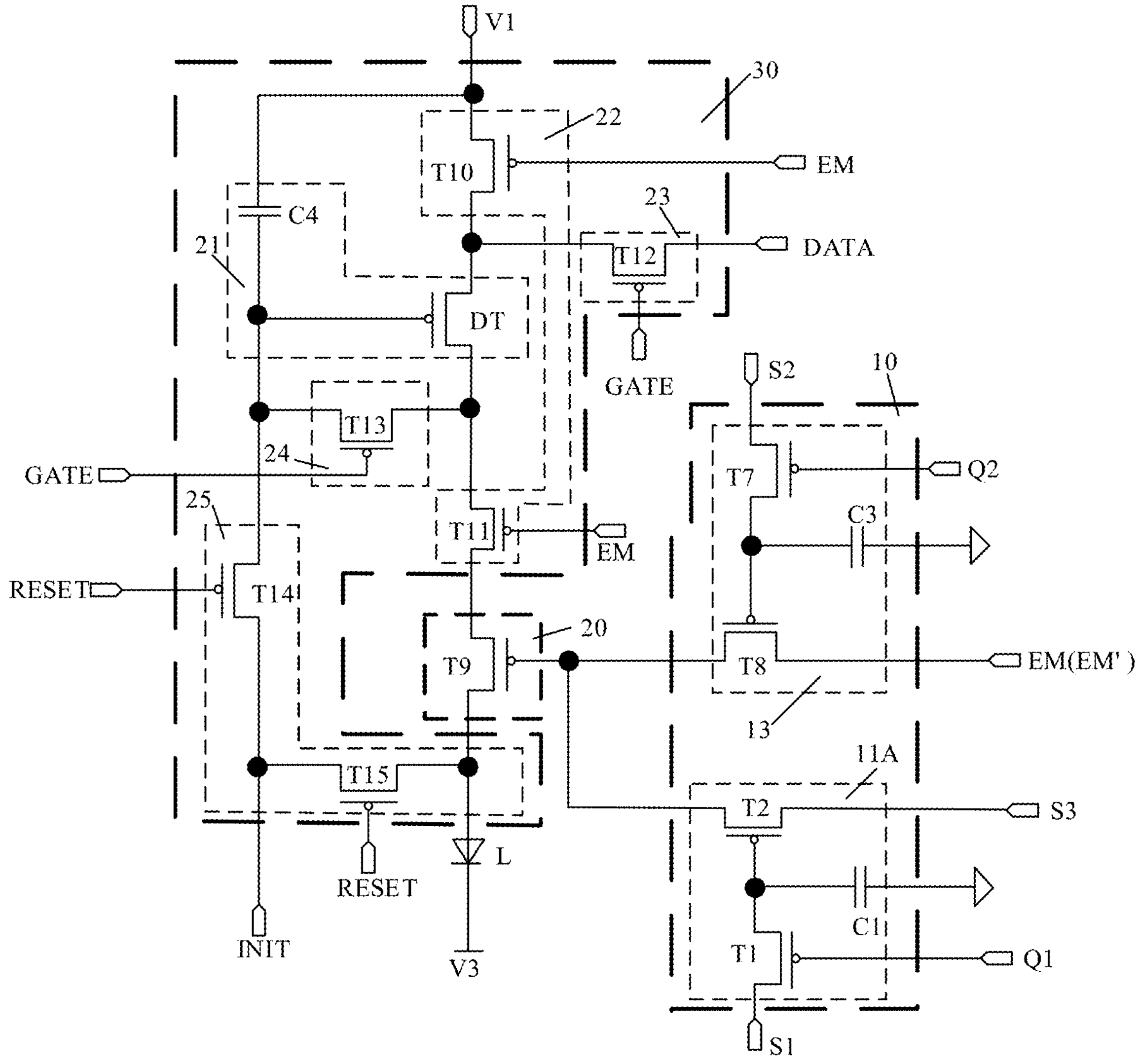
FIG. 6D is a structural diagram of yet another pixel circuit, in accordance with some embodiments.

For another example, as shown in FIGS. 6C and 6D, the driving control sub-circuit 22 includes a tenth transistor T10 and an eleventh transistor T11.

A control electrode of the tenth transistor T10 is coupled to the first enable signal terminal EM, a first electrode of the tenth transistor T10 is coupled to the first voltage terminal V1, and a second electrode of the tenth transistor T10 is coupled to the first electrode of the driving transistor DT.

A control electrode of the eleventh transistor T11 is coupled to the first enable signal terminal EM, a first electrode of the eleventh transistor T11 is coupled to the second electrode of the driving transistor DT, and a second electrode of the eleventh transistor T11 is coupled to the second control circuit 20.

In the case where the second control circuit 20 includes the ninth transistor T9, the second electrode of the eleventh transistor T11 is coupled to the first electrode of the ninth transistor T9.

It will be understood that, in the period in which the first enable signal is at the inactive level, e.g., a period when the data signal is written, the eleventh transistor T11 is in a turn-off state due to the control of the first enable signal, so that the driving transistor DT is disconnected from the second control circuit 20, which avoids a situation where an accuracy of writing of the data signal is affected due to an influence of the pulse signal of the third input signal on a voltage of the second electrode of the driving transistor DT in a case where the second control circuit 20 receives the third input signal.

For example, as shown in FIGS. 6A to 6D, the data writing sub-circuit 23 includes a twelfth transistor T12.

A control electrode of the twelfth transistor T12 is coupled to the scan signal terminal GATE, a first electrode of the twelfth transistor T12 is coupled to the data signal terminal DATA, and a second electrode of the twelfth transistor T12 is coupled to the first electrode of the driving transistor DT.

For example, as shown in FIGS. 6A to 6D, the compensation sub-circuit 24 includes a thirteenth transistor T13.

A control electrode of the thirteenth transistor T13 is coupled to the scan signal terminal GATE, a first electrode of the thirteenth transistor T13 is coupled to the second electrode of the driving transistor DT, and a second electrode of the thirteenth transistor T13 is coupled to the control electrode of the driving transistor DT.

It will be understood that, the thirteenth transistor T13 may write the data signal and the threshold voltage of the driving transistor DT into the control electrode of the driving transistor DT, so as to achieve threshold voltage compensation.

In some embodiments, as shown in FIGS. 5A and 5B, the driving circuit 30 further includes a reset sub-circuit 25. The reset sub-circuit 25 is coupled to the driving sub-circuit 21, the element L to be driven, the reset signal terminal RESET and an initial signal terminal INIT.

The reset sub-circuit 25 is configured to transmit an initial signal received at the initial signal terminal INIT to the driving sub-circuit 21 and the element L to be driven, in response to the reset signal received at the reset signal terminal RESET. In this way, the driving sub-circuit 21 and the element L to be driven may be reset to avoid interference of signals.

It will be noted that, a voltage of the initial signal may be selected according to actual situations, which is not limited here. For example, the initial signal may be a high-level signal or a low-level signal.

For example, as shown in FIGS. 6A to 6D, the reset sub-circuit 26 includes a fourteenth transistor T14 and a fifteenth transistor T15.

A control electrode of the fourteenth transistor T14 is coupled to the reset signal terminal RESET, a first electrode of the fourteenth transistor T14 is coupled to the initial signal terminal INIT, and a second electrode of the fourteenth transistor T14 is coupled to the driving sub-circuit 21.

A control electrode of the fifteenth transistor T15 is coupled to the reset signal terminal RESET, a first electrode of the fifteenth transistor T15 is coupled to the initial signal terminal INIT, and a second electrode of the fifteenth transistor T15 is coupled to the element L to be driven.

For example, the second electrode of the fourteenth transistor T14 is coupled to the control electrode of the driving transistor DT. The second electrode of the fifteenth transistor T15 is coupled to the first electrode of the element L to be driven.

It can be understood that, the fourteenth transistor T14 may transmit the initial signal to the control electrode of the driving transistor DT, so as to reset a voltage of the control electrode of the driving transistor DT; and the fifteenth transistor T15 may transmit the initial signal to the first electrode of the element L to be driven, so as to reset a voltage of the first electrode of the element L to be driven.

In some embodiments, the first enable signal terminal and the second enable signal terminal are coupled to a same signal line. In this way, referring to FIG. 6D, the first electrode of the eighth transistor T8 is coupled to the first enable signal terminal EM.

It will be noted that, a specific implementation manner of the driving circuit is not limited to the manner described above, and it may be any implementation manner that is used, e.g., a conventional connection manner well known to those skilled in the art, as long as implementation of corresponding functions is ensured. A circuit that can implement the functions of the above-mentioned driving circuit is, for example, a circuit capable of providing the driving signal, which is within the protection scope of the present disclosure.

In some embodiments, as shown in FIGS. 7A to 7D, the display panel 100 further includes a plurality of scan signal lines GL, a plurality of data signal lines DL, a plurality of enable signal lines E, and a plurality of reset signal lines RL.

In some examples, scan signal terminals GATE that are coupled to pixel circuits in a row of sub-pixels are coupled to a scan signal line GL, first enable signal terminals EM that are coupled to the pixel circuits in the row of sub-pixels are coupled to an enable signal line E, and reset signal terminals RESET that are coupled to the pixel circuits in the row of sub-pixels are coupled to a reset signal line RL; and data signal terminals DATA that are coupled to pixel circuits in a column of sub-pixels are coupled to a data signal line DL. For example, second enable signal terminals and the first enable signal terminals that are coupled to the pixel circuits in the row of sub-pixels may be coupled to the same enable signal line E. For another example, the row of pixel circuits are coupled to two enable signal lines, and the second enable signal terminals and the first enable signal terminals are coupled to different enable signal lines.

In some examples, the scan signal terminal GATE and one of the first control signal terminal Q1 and the second control signal terminal Q2 that are coupled to the same pixel circuit are coupled to the same scan signal line, and the reset signal terminal RESET and the other of the first control signal terminal Q1 and the second control signal terminal Q2 that are coupled to the same pixel circuit are coupled to the same reset signal line. In some examples, the first input signal terminal S1 and the second input signal terminal S2 that are coupled to the same pixel circuit are coupled to the same signal line, such as a second signal line described below; therefore, by controlling amplitudes of signals transmitted by the second signal line, the signals with different amplitudes are provided to the first input signal terminal S1 and the second input signal terminal S2. With this design, it is possible to have a relatively generous wiring space to facilitate realization of a relatively high resolution.

In some embodiments, as shown in FIGS. 7A to 7D, the display panel 100 further includes a plurality of first signal lines LQ and a plurality of second signal lines LS.

Figure 7A:
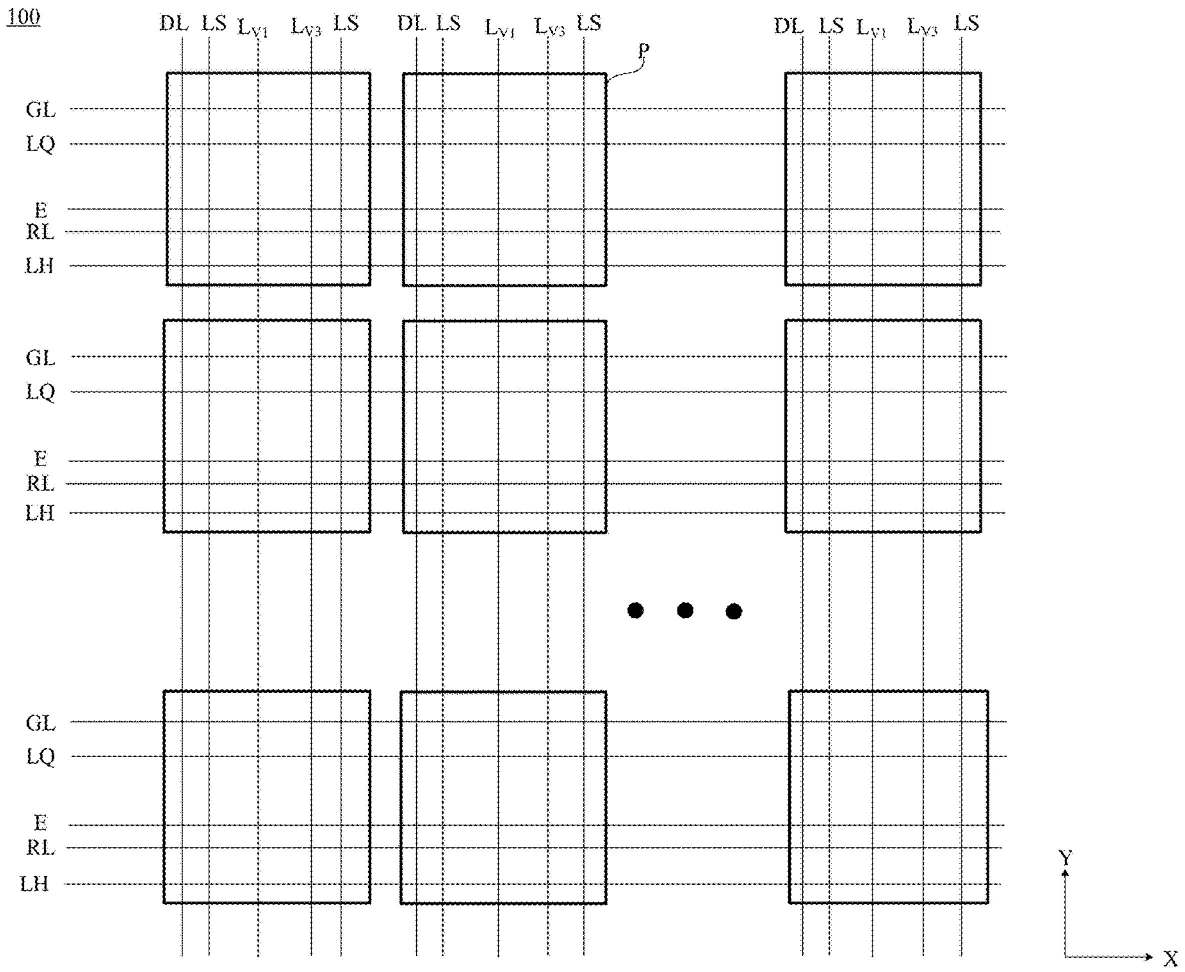
FIG. 7A is a structural diagram of a display panel, in accordance with some embodiments.

For example, first control signal terminals Q1 and second control signal terminals Q2 that are coupled to a row of pixel circuits are coupled to the same first signal line LQ, first input signal terminals S1 and second input signal terminals S2 that are coupled to a column of pixel circuits are coupled to two second signal lines LS, and the first input signal terminals S1 and the second input signal terminals S2 are coupled to different second signal lines LS. In this case, as shown in FIG. 7A, a row of sub-pixels is coupled to the same first signal line LQ, and a column of sub-pixels is coupled to two second signal lines LS.

It can be understood that, a timing of the first control signal and a timing of the second control signal are the same, and a timing of the first input signal and a timing of the second input signal are different.

In this way, the first control circuit 10 simultaneously receives the first input signal and the second input signal in response to the signal at the first control signal terminal Q1 and the second control signal terminal Q2, so that the pixel circuit control the element to be driven to display a corresponding grayscale.

Figure 7B:
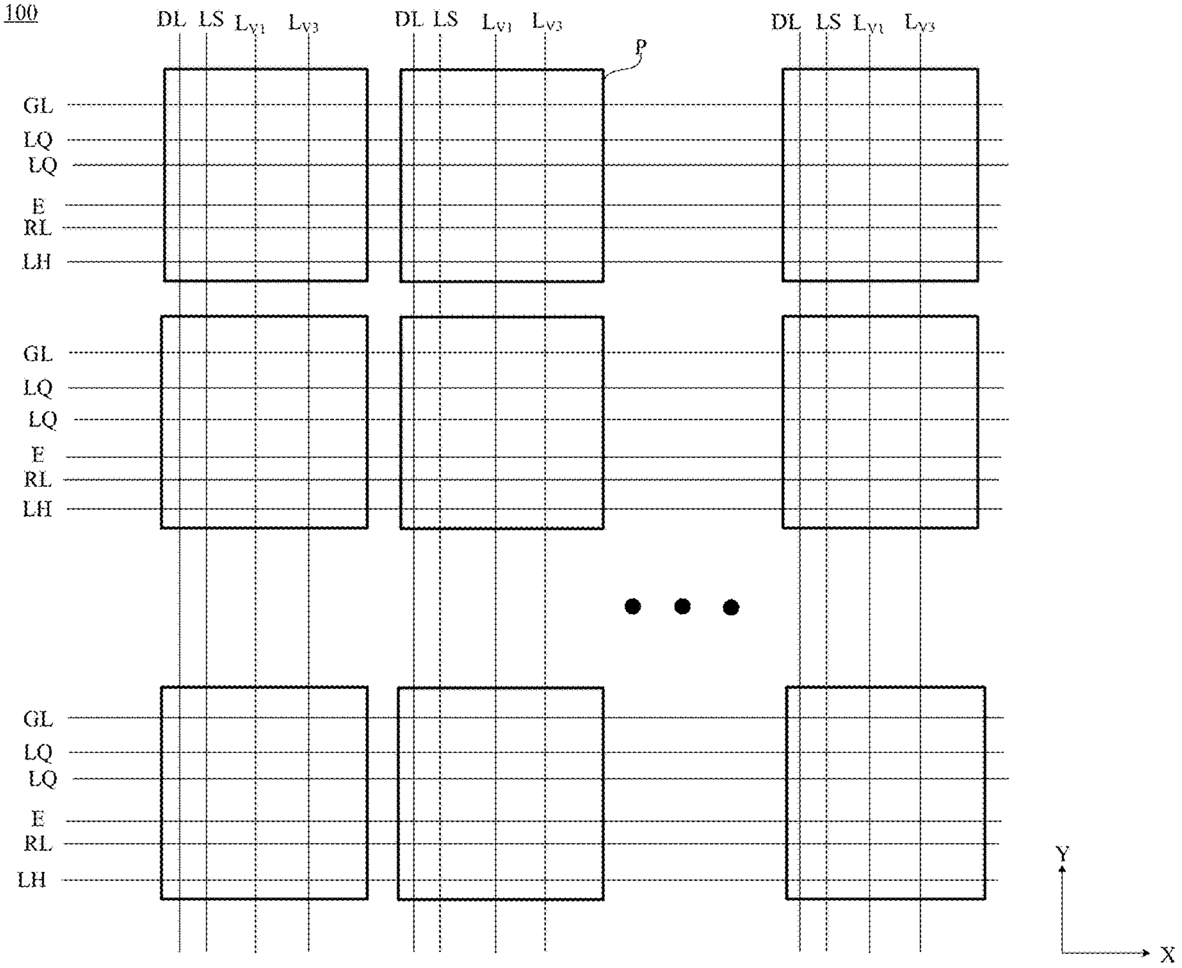
FIG. 7B is a structural diagram of another display panel, in accordance with some embodiments.

For example, first control signal terminals Q1 and second control signal terminals Q2 that are coupled to a row of pixel circuits are coupled to two first signal lines LQ, and the first control signal terminals Q1 and the second control signal terminals Q2 are coupled to different first signal lines LQ; and first input signal terminals S1 and second input signal terminals S2 that are coupled to a column of pixel circuits are coupled to the same second signal line LS. In this case, as shown in FIG. 7B, a row of sub-pixels is coupled to two first signal lines LQ, and a column of sub-pixels is coupled to the same second signal line LS. That is, in the same column of pixel circuits, the first input signal terminal S1 and the second input signal terminal S2 that are coupled to each pixel circuit are coupled to the same second signal line LS. In this way, by controlling amplitudes of signals transmitted by the second signal line LS, signals with different amplitudes are provided to the first input signal terminals S1 and the second input signal terminals S2 that are coupled to the column of pixel circuits. In a case where the plurality of pixel circuits are arranged in an array, the number of signal lines to which each column of pixel circuits is coupled may be reduced, so that the display panel may have a relatively generous wiring space, which facilitates the realization of the relatively high resolution of the display panel.

Therefore, in response to signals at the first control signal terminal Q1 and the second control signal terminal Q2, the first control circuit 10 receives the first input signal and the second input signal at different time, respectively.

Figure 7C:
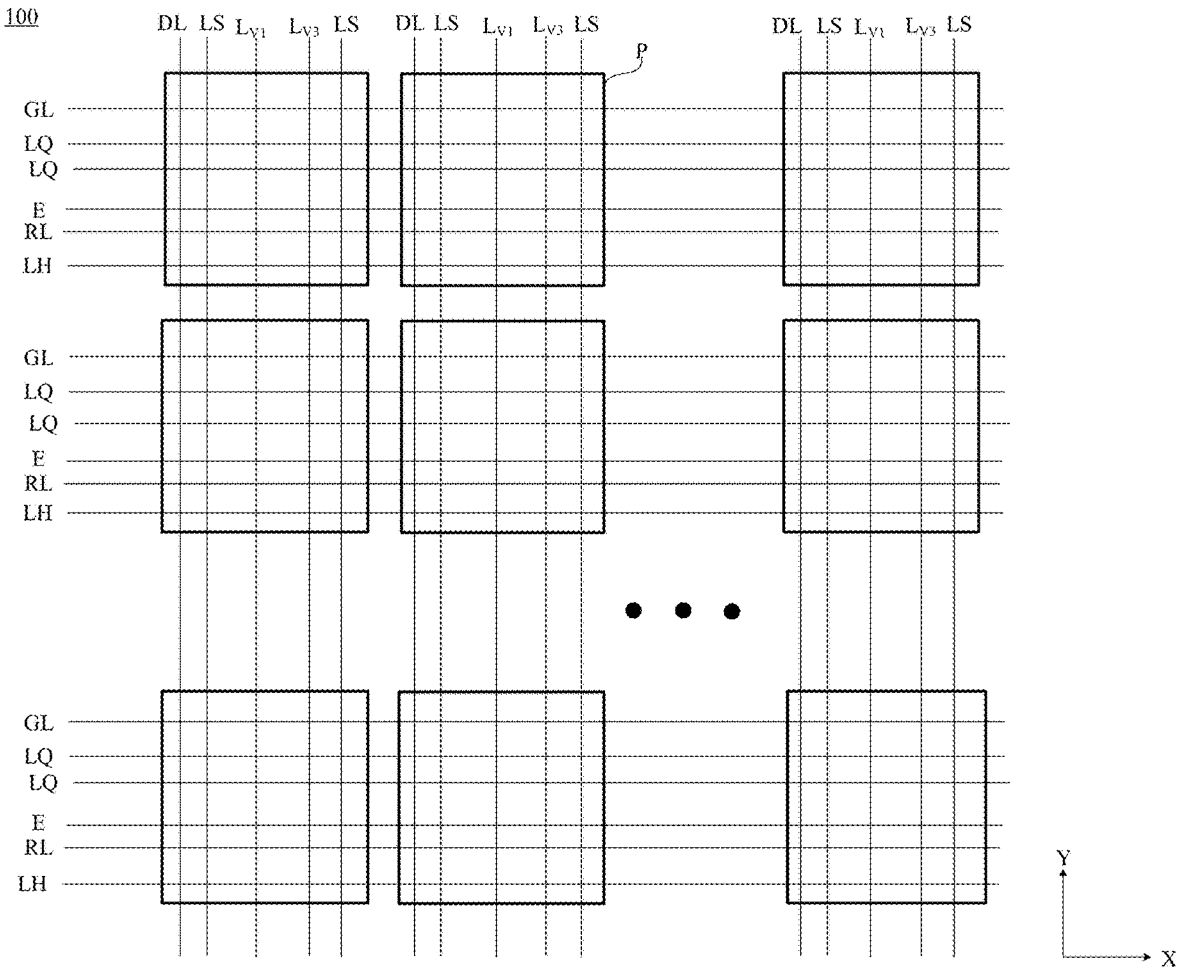
FIG. 7C is a structural diagram of yet another display panel, in accordance with some embodiments.

For example, first control signal terminals Q1 and second control signal terminals Q2 that are coupled to a row of pixel circuits are coupled to two first signal lines LQ, and the first control signal terminals Q1 and the second control signal terminals Q2 are coupled to different first signal lines LQ; and first input signal terminals S1 and second input signal terminals S2 that are coupled to a column of pixel circuits are coupled to two second signal lines LS, and the first input signal terminals S1 and the second input signal terminals S2 are coupled to different second signal lines LS. In this case, as shown in FIG. 7C, the row of sub-pixels is coupled to the two first signal lines LQ, and the column of sub-pixels is coupled to the two second signal lines LS. For example, the two first signal lines LQ provide the first control signal and the second control signal to the first control signal terminal Q1 and the second control signal terminal Q2, respectively; and the two second signal lines LS provide the first input signal and the second input signal to the first input signal terminal S1 and the second input signal terminal S2, respectively.

For example, in a case where the first control circuit 10 is further coupled to the third control signal terminal Q3, third control signal terminals Q3 that are coupled to a row of pixel circuits are coupled to a first signal line LQ, and the first signal line LQ coupled to the third control signal terminal Q3 is different from the first signal line LQ coupled to the first control signal terminal Q1 and the first signal line LQ coupled to the second control signal terminal Q2. In this case, as shown in FIG. 7D, the row of sub-pixels is coupled to at least two first signal lines LQ.

In some embodiments, as shown in FIGS. 7A to 7D, the display panel 100 further includes a plurality of input signal lines LH. The third input signal terminal that is coupled to the pixel circuit is coupled to an input signal line. For example, the plurality of input signal lines may be arranged in a grid pattern. For example, a part of the plurality of input signal lines is parallel to the scan signal lines, and the other part of the plurality of input signal lines is parallel to the data signal lines. For example, the row of sub-pixels is coupled to one input signal line. That is, third input signal terminals that are coupled to the row of pixel circuits are coupled to the input signal line. For another example, the column of sub-pixels is coupled to one input signal line. That is, third input signal terminals that are coupled to the column of pixel circuits are coupled to the input signal line.

For another example, the plurality of input signal lines are parallel to the scan signal lines. For example, the row of sub-pixels is coupled to one input signal line. That is, third input signal terminals that are coupled to the row of pixel circuits are coupled to the input signal line. For example, in the period in which the first enable signal is at the inactive level, i.e., including a data signal writing period and a reset period, the third input signal, the first enable signal and the second enable signal received by the pixel circuit in the sub-pixel are at a same level, such as a high level.

Figure 7D:
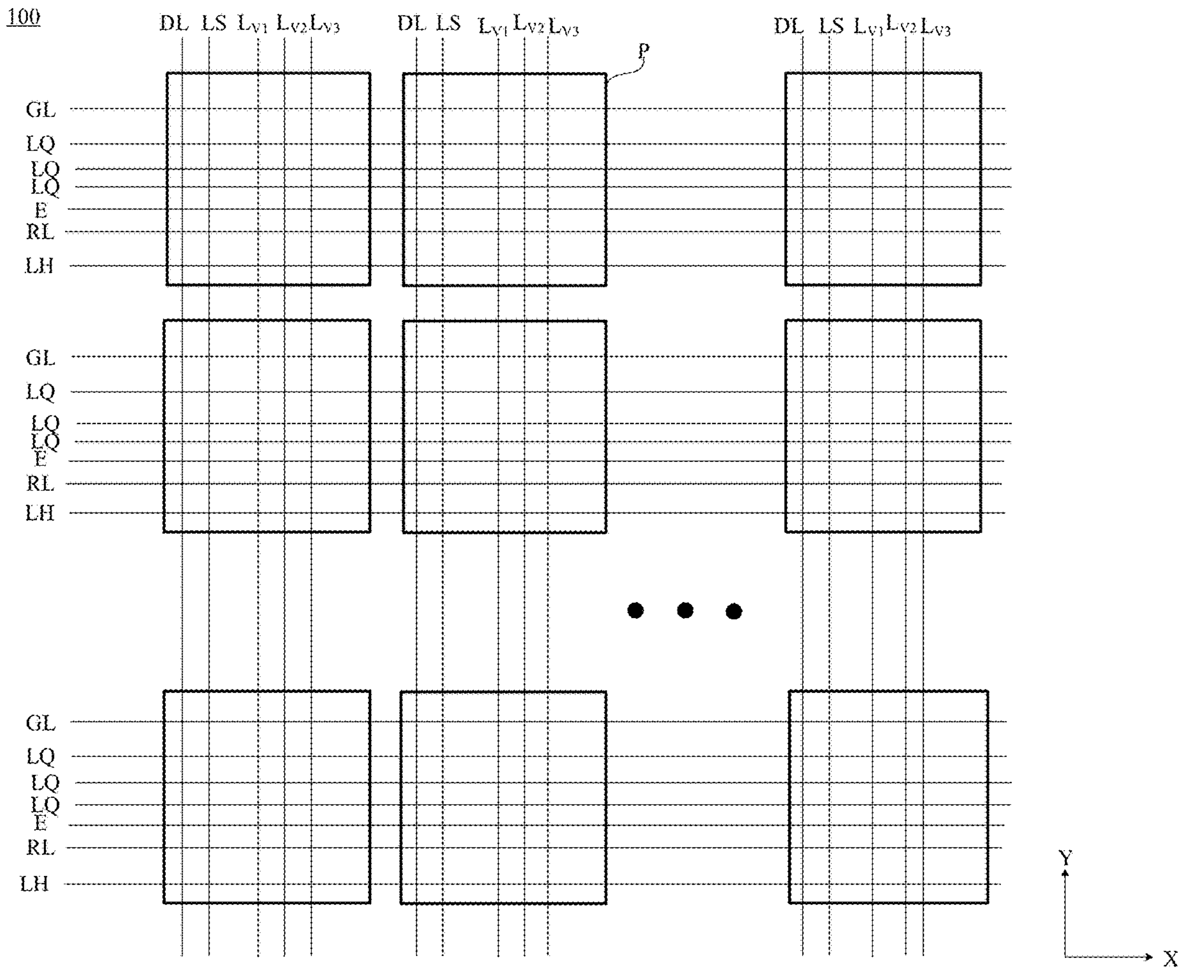
FIG. 7D is a structural diagram of yet another display panel, in accordance with some embodiments.

In addition, as shown in FIGS. 7A to 7D, the display panel 100 further includes a plurality of first voltage lines $L_{V1}$ and a plurality of third voltage lines $L_{V3}$. In a case where the first control circuit 10 is further coupled to the second voltage terminal V2, as shown in FIG. 7D, the display panel 100 further includes a plurality of second voltage lines $L_{V2}$.

It will be noted that, those skilled in the art may set wiring manners of the first voltage lines $L_{V1}$, the second voltage lines $L_{V2}$, and the third voltage lines $L_{V3}$, and coupling manners between the pixel circuits in the sub-pixels and the first voltage lines $L_{V1}$, the second voltage lines $L_{V2}$ and the third voltage lines $L_{V3}$ according to a spatial structure of the display panel, and details are not limited here. For example, referring to FIG. 7D, in the column of sub-pixels, first voltage terminals that are coupled to the pixel circuits may be coupled to one first voltage line $L_{V1}$, second voltage terminals that are coupled to the pixel circuits may be coupled to one second voltage line $L_{V2}$, and third voltage terminals coupled to elements to be driven may be coupled to one third voltage line $L_{V3}$. In this case, the first voltage line $L_{V1}$ provides the first voltage to the first voltage terminals V1, the second voltage line $L_{V2}$ provides the second voltage to the second voltage terminals V2, and the third voltage line $L_{V3}$ provides the third voltage to the third voltage terminals V3.

In some embodiments, the first control signal terminal Q1 and the reset signal terminal RESET are coupled to a same signal line, the second control signal terminal Q2 and the scan signal terminal GATE are coupled to a same signal line, and the first input signal terminal S1 and the second input signal terminal S2 are coupled to a same signal line.

For example, the first control signal terminals Q1 and the reset signal terminals RESET that are coupled to the row of pixel circuits are coupled to the reset signal line RL; and the second control signal terminals Q2 and the scan signal terminals GATE that are coupled to the row of pixel circuits are coupled to the scan signal line GL. In this way, in the case where the plurality of pixel circuits are arranged in an array, the number of signal lines coupled to each row of pixel circuits may be reduced, so that the display panel may have a relatively generous wiring space, which facilitates realization of a high resolution of the display panel.

It can be understood that, a timing of the first control signal is the same as a timing of the reset signal, a timing of the second control signal is the same as a timing of the scan signal. In a case where a sub-pixel is coupled to one second signal line, the pixel circuit in the sub-pixel may receive different first input signal and second input signal at different time, so that the pixel circuit control the element to be driven to display a corresponding grayscale.

In some other embodiments, the first control signal terminal Q1 and the scan signal terminal GATE are coupled to a same signal line, and the second control signal terminal Q2 and the reset signal terminal RESET are coupled to a same signal line.

For example, the first control signal terminals Q1 and the scan signal terminals GATE that are coupled to the row of pixel circuits are coupled to the scan signal line GL; and the second control signal terminals Q2 and the reset signal terminals RESET that are coupled to the row of pixel circuits are coupled to the reset signal line RL. In this way, in the case where the plurality of pixel circuits are arranged in an array, the number of signal lines coupled to each row of pixel circuits may be reduced, so that the display panel may have a relatively generous wiring space, which facilitates realization of a high resolution of the display panel.

In some other embodiments, the first control signal terminal Q1 and the second control signal terminal Q2 are both coupled to the reset signal terminal RESET, or are both coupled to the scan signal terminal GATE; and the first input signal terminal S1 and the second input signal terminal S2 are different signal terminals.

For example, the first control signal terminal Q1 and the second control signal terminal Q2 are coupled to the reset signal line RL. For another example, the first control signal terminal Q1 and the second control signal terminal Q2 are coupled to the scan signal line GL.

It will be noted that, the transistors used in the pixel circuit provided in the embodiments of the present disclosure may be thin film transistors (TFTs), field effect transistors (FETs) or other switching devices with same characteristics, which is not limited in the embodiments of the present disclosure.

In some embodiments, a control electrode of each transistor used in the pixel circuit is a gate of the transistor, a first electrode of the transistor is one of a source and a drain of the transistor, and a second electrode of the transistor is the other of the source and the drain of the transistor. Since the source and the drain of the transistor may be symmetrical in structure, there may be no difference in structure between the source and the drain of the transistor. That is, the first electrode and the second electrode of the transistor in the embodiments of the present disclosure may be the same in structure. For example, in a case where the transistor is a P-type transistor, the first electrode of the transistor is the source, and the second electrode of the transistor is the drain. For example, in a case where the transistor is an N-type transistor, the first electrode of the transistor is the drain, and the second electrode of the transistor is the source.

In the pixel circuit provided in the embodiments of the present disclosure, specific implementation manners of the circuits and the sub-circuits are not limited to the manners described above, and may be other implementation manners that are used, as long as implementation of corresponding functions is ensured. The above examples and embodiments cannot limit the protection scope of the present disclosure. In practical applications, a person skilled in the art may choose to use or not to use one or more of the above circuits and sub-circuits according to situations. Various combinations and changes based on the above circuits and sub-circuits do not depart from the principle of the present disclosure, which will not be repeated here.

It will be noted that a period of an image frame includes a scan period and an operating period. For example, the scan period includes a scan period of each row of sub-pixels. The scan period of each row of sub-pixels includes a first period and a second period that are described below. The operating period includes a third period described below.

For example, the rows of sub-pixels in the display panel may sequentially enter the scan period row by row. For example, a first row of sub-pixels to a last row of sub-pixels enter the scan period row by row, and after the scan period of the last row of sub-pixels ends, the first row of sub-pixels to the last row of sub-pixels enter the operating period row by row. An active duration of the first enable signal corresponding to each sub-pixel in the operating period is the same. For another example, the rows of sub-pixels of the display panel may enter the operating period simultaneously after sequentially entering the scan period row by row.

For example, each pixel circuit may also directly enter the operating period after the scan period of each row of sub-pixels ends. For example, the first row of sub-pixels enters the operating period after the scan period of the first row of sub-pixels ends, a second row of sub-pixels enters the scan period after the scan period of the first row of sub-pixels ends, the second row of sub-pixels enters the operating period after the scan period of the second row of sub-pixels ends, and so on, until the last row of sub-pixels enters the operating period after the scan period of the last row of sub-pixels ends.

It will be noted that, in the scan period of each row, different or same data signals are written into the pixel circuits in a row of sub-pixels simultaneously. That is, the data signals are a group of signals. The data signals written into the pixel circuits are related to grayscales that the corresponding sub-pixels need to display.

Hereinafter, operations of the pixel circuit in different periods in an image frame will be described by taking an example in which the transistors in the pixel circuit are all P-type transistors. The first enable signal and the second enable signal are the same signal.

It will be noted that, for the convenience of description, the signals (e.g., the first input signal, the second input signal, the third input signal, the first control signal, the second control signal, the third control signal, the scan signal, the data signal, the reset signal, the first enable signal, the second enable signal, the first voltage, the second voltage, the third voltage, etc.) transmitted by the signal terminals (e.g., the first input signal terminal, the second input signal terminal, the third input signal terminal, the first control signal terminal, the second control signal terminal, the third control signal terminal, the scan signal terminal, the data signal terminal, the reset signal terminal, the first enable signal terminal, the second enable signal terminal, the first voltage terminal, the second voltage terminal, the third voltage terminal, etc.) are represented by the same reference signs in the figures, but actual meanings of a signal terminal and a signal transmitted by the signal terminal are different.

For example, durations of the first period (U1) (i.e., a reset period) and the second period (U2) (i.e., a data signal writing period) in an image frame below is approximately in a magnitude of microseconds (μs), and a duration of the third period (U3) in the image frame is approximately in a magnitude of milliseconds (ms).

Figure 8:
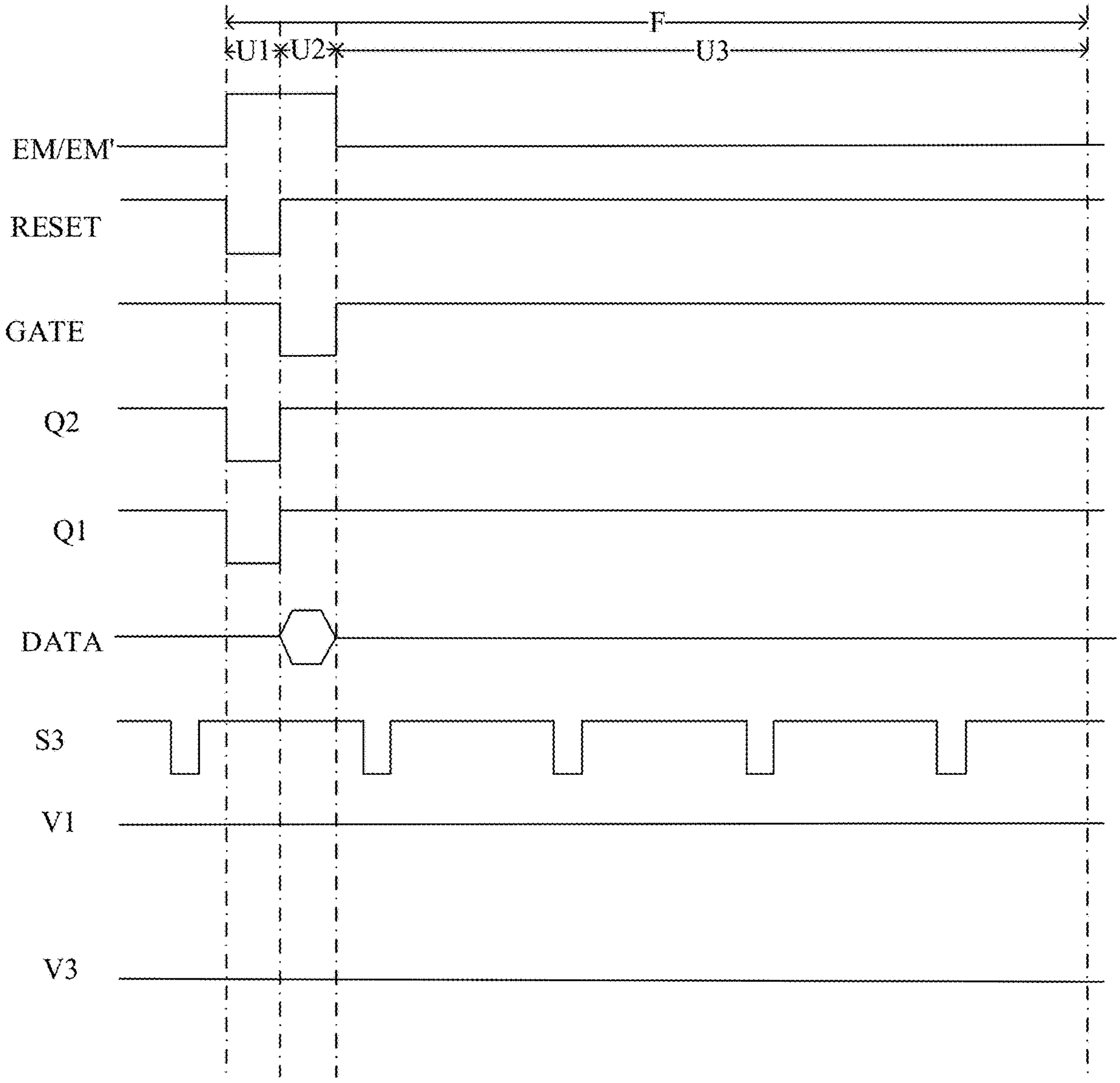
FIG. 8 is a timing diagram of signals for driving a pixel circuit, in accordance with some embodiments.

In the first period (U1) in an image frame (F) as shown in FIG. 8, referring to FIGS. 5A and 5B, the reset sub-circuit 25 in the driving circuit 30 transmits the initial signal received at the initial signal terminal INIT to the driving sub-circuit 21 and the element L to be driven, in response to the reset signal received at the reset signal terminal RESET.

For example, referring to FIGS. 6A to 6D, the fourteenth transistor T14 in the reset sub-circuit 25 is turned on in response to a low level of the reset signal received at the reset signal terminal RESET, and transmits the initial signal received at the initial signal terminal INIT to the control electrode of the driving transistor DT in the driving sub-circuit 21 to reset the voltage of the control electrode of the driving transistor DT. The fifteenth transistor T15 is turned on in response to the low level of the reset signal received at the reset signal terminal RESET, and transmits the initial signal received at the initial signal terminal INIT to the first electrode of the element L to be driven to reset the voltage of the first electrode of the element L to be driven. The voltage of the control electrode of the driving transistor DT and the voltage of the first electrode of the element L to be driven are both the voltage of the initial signal.

In this case, the initial signal received at the initial signal terminal INIT may eliminate an influence of signals of a previous frame on voltages of the control electrode of the driving transistor DT and the first electrode of the element L to be driven. For example, the initial signal may be a low-level signal or a high-level signal. For example, in a case where the driving transistor is a P-type transistor, the voltage of the initial signal is greater than zero.

For example, in the first period (U1) as shown in FIG. 8, a timing of the first control signal received at the first control signal terminal Q1 and a timing of the second control signal received at the second control signal terminal Q2 are the same as a timing of the reset signal received at the reset signal terminal RESET.

Referring to FIGS. 5A and 5B, the second input sub-circuit 13 in the first control circuit 10 receives the second input signal received at the second input signal terminal S2 in response to the second control signal received at the second control signal terminal Q2. For example, referring to FIGS. 6A to 6D, the seventh transistor T7 in the second input sub-circuit 13 is turned on in response to a low level of the second control signal received at the second control signal terminal Q2, and receives the second input signal received at the second input signal terminal S2; and the third capacitor C3 stores the second input signal.

Referring to FIG. 5A, the first input sub-circuit 11A in the first control circuit 10 receives the first input signal received at the first input signal terminal S1 in response to the first control signal received at the first control signal terminal Q1. For example, referring to FIG. 6A, the first transistor T1 is turned on in response to a low level of the first control signal received at the first control signal terminal Q1, and receives the first input signal received at the first input signal terminal S1; and the first capacitor C1 stores the first input signal.

Referring to FIG. 5B, the voltage stabilizing sub-circuit 12 in the first control circuit 10 transmits the second voltage at the second voltage terminal V2 to the second control circuit 20 in response to the third control signal received at the third control signal terminal Q3. The first input sub-circuit 11B in the first control circuit 10 receives the first input signal received at the first input signal terminal S1 in response to the first control signal received at the first control signal terminal Q1.

Figure 11:
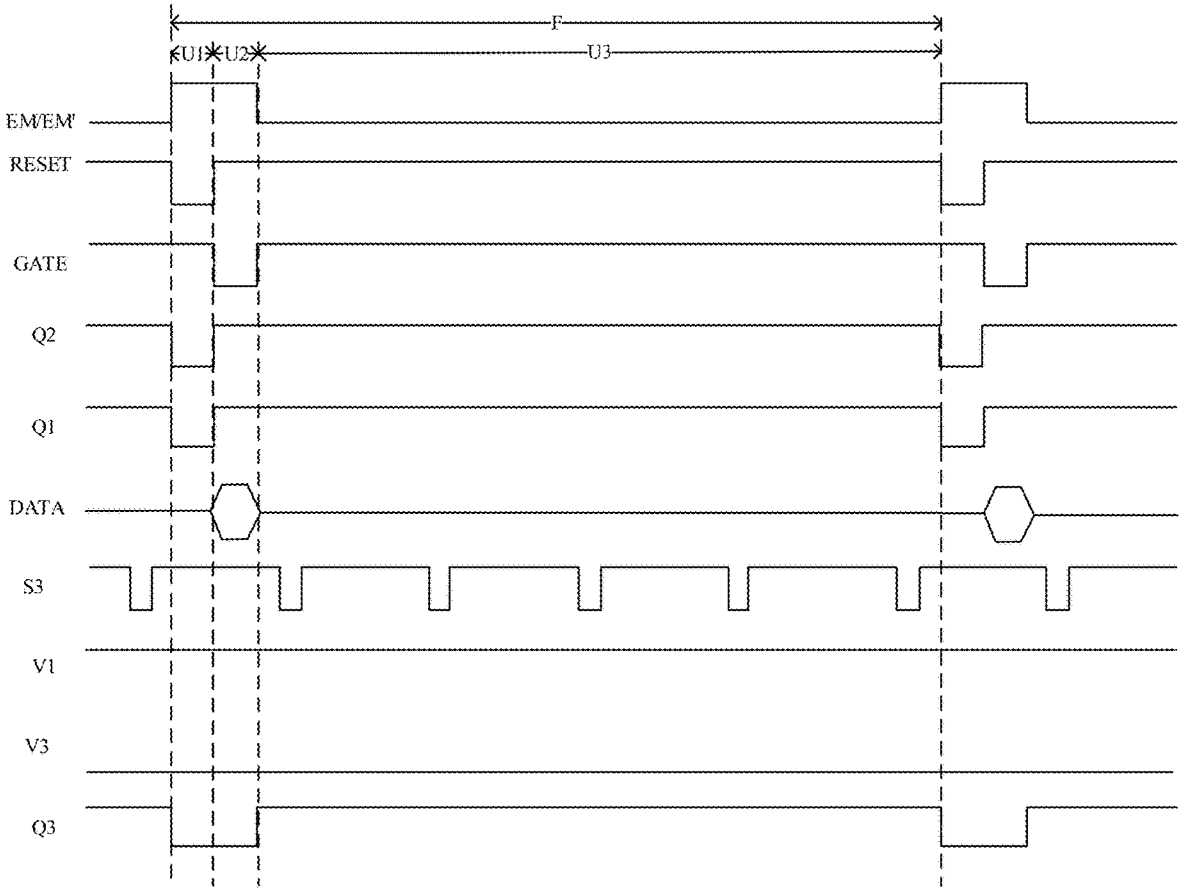
FIG. 11 is yet another timing diagram of signals for driving a pixel circuit, in accordance with some embodiments.
Figure 12:
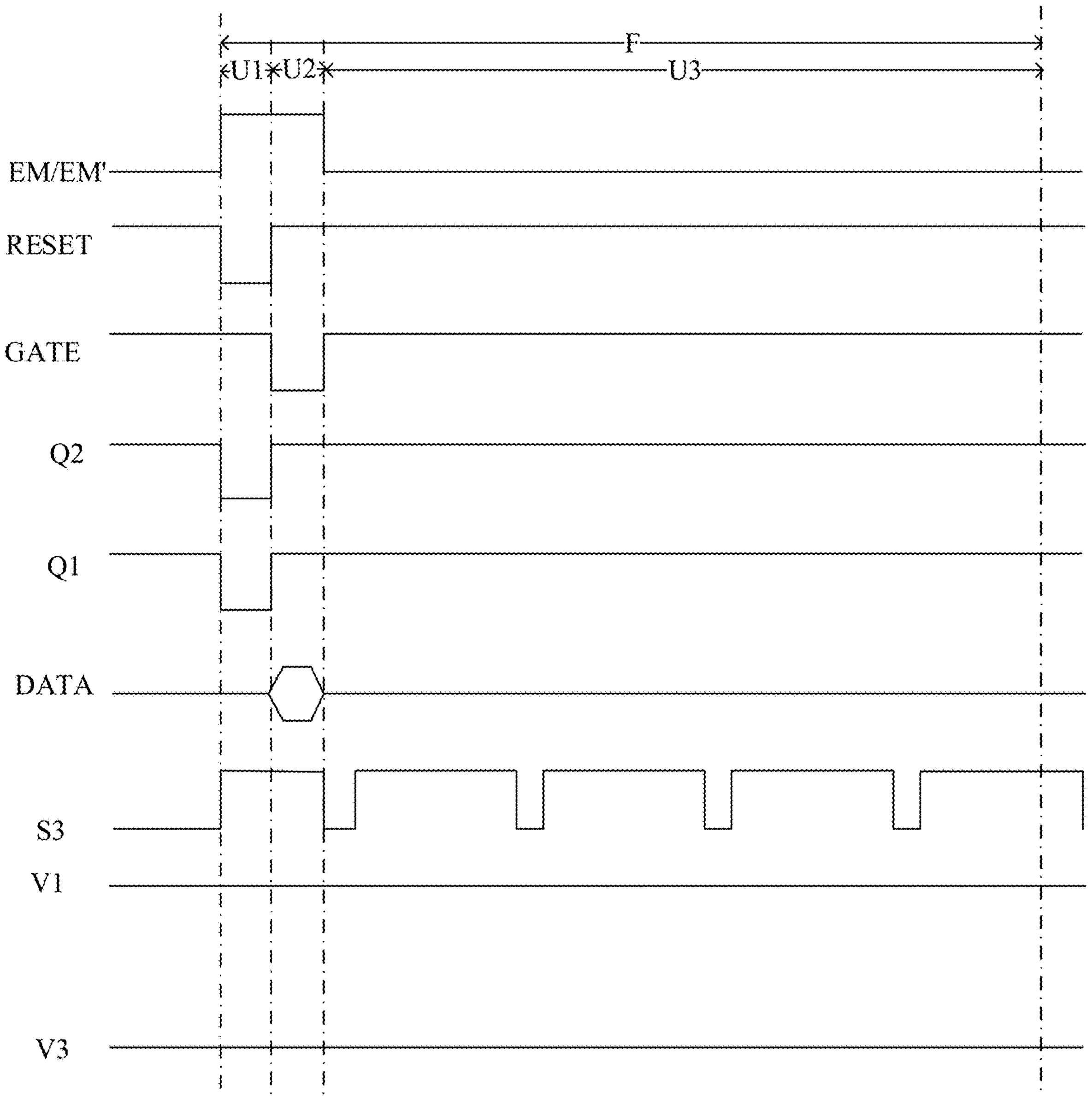
FIG. 12 is yet another timing diagram of signals for driving a pixel circuit, in accordance with some embodiments.

For example, referring to FIG. 6B, the sixth transistor T6 in the voltage stabilizing sub-circuit 12 transmits the second voltage at the second voltage terminal V2 to the second control circuit 20 in response to a low level of third control signal received at the third control signal terminal Q3 (referring to FIG. 11). The ninth transistor T9 in the second control circuit 20 is turned off due to a high-level second voltage, and the driving circuit 30 and the element L to be driven do not form a conductive path. The third transistor T3 in the first input sub-circuit 11B is turned on in response to the low level of the first control signal received at the first control signal terminal Q1, and receives the first input signal received at the first input signal terminal S1; and the first capacitor C1 stores the first input signal.

In a case where the sub-pixel including the pixel circuit displays a low grayscale, the second input signal is a high-level signal, and the first input signal is a low-level signal. Referring to FIGS. 6A to 6D, the eighth transistor T8 in the second input sub-circuit 13 is turned off due to the high level of the second input signal, and will not transmit the second enable signal received at the second enable signal terminal EM' to the second control circuit 20.

Referring to FIG. 6A, the second transistor T2 in the first input sub-circuit 11A is turned on in response to the low level of the first input signal, and transmits the third input signal received at the third input signal terminal S3 to the second control circuit 20. In this case, the third input signal is at a high level in the first period U1. The ninth transistor T9 in the second control circuit 20 is turned off due to the high level of the third input signal from the first control circuit 10, and thus the driving circuit 30 and the element L to be driven do not form the conductive path.

Referring to FIG. 6B, the fourth transistor T4 in the first input sub-circuit 11B is turned on in response to the low level of the first input signal, the fifth transistor T5 in the voltage stabilizing sub-circuit 12 is turned off due to a high level of the first enable signal received at the first enable signal terminal EM, and the fourth transistor T4 and the fifth transistor T5 will not transmit the third input signal received at the third input signal terminal S3 to the second control circuit 20.

In a case where a display grayscale of the sub-pixel is a medium or high grayscale, the second input signal is a low-level signal, and the first input signal is a high-level signal. Referring to FIGS. 6A to 6D, the eighth transistor T8 in the second input sub-circuit 13 is turned on in response to the low level of the second input signal, and transmits a high level of the second enable signal received at the second enable signal terminal EM' to the second control circuit 20. The ninth transistor T9 in the second control circuit 20 is turned off due to the high level of the second enable signal, and thus the driving circuit 30 and the element L to be driven do not form the conductive path.

Referring to FIG. 6A, the second transistor T2 in the first input sub-circuit 11A is turned off due to the high level of the first input signal, and will not transmit the third input signal received at the third input signal terminal S3 to the second control circuit 20.

Referring to FIG. 6B, the fourth transistor T4 in the first input sub-circuit 11B is turned off due to the high level of the first input signal, the fifth transistor T5 in the voltage stabilizing sub-circuit 12 is turned off due to the high level of the first enable signal received at the first enable signal terminal EM, and the fourth transistor T4 and the fifth transistor T5 will not transmit the third input signal received at the third input signal terminal S3 to the second control circuit 20.

In this case, in the first period U1, it may avoid an influence on a voltage of the second electrode of the driving transistor DT in the driving circuit 30 coupled to the ninth transistor T9, and avoid an influence on an accuracy of the data signal subsequently written into the driving circuit 30. The level of the third input signal in the first period may not be limited. For example, the third input signal may be at the high level, or may be a signal with high and low levels alternating.

Figure 9:
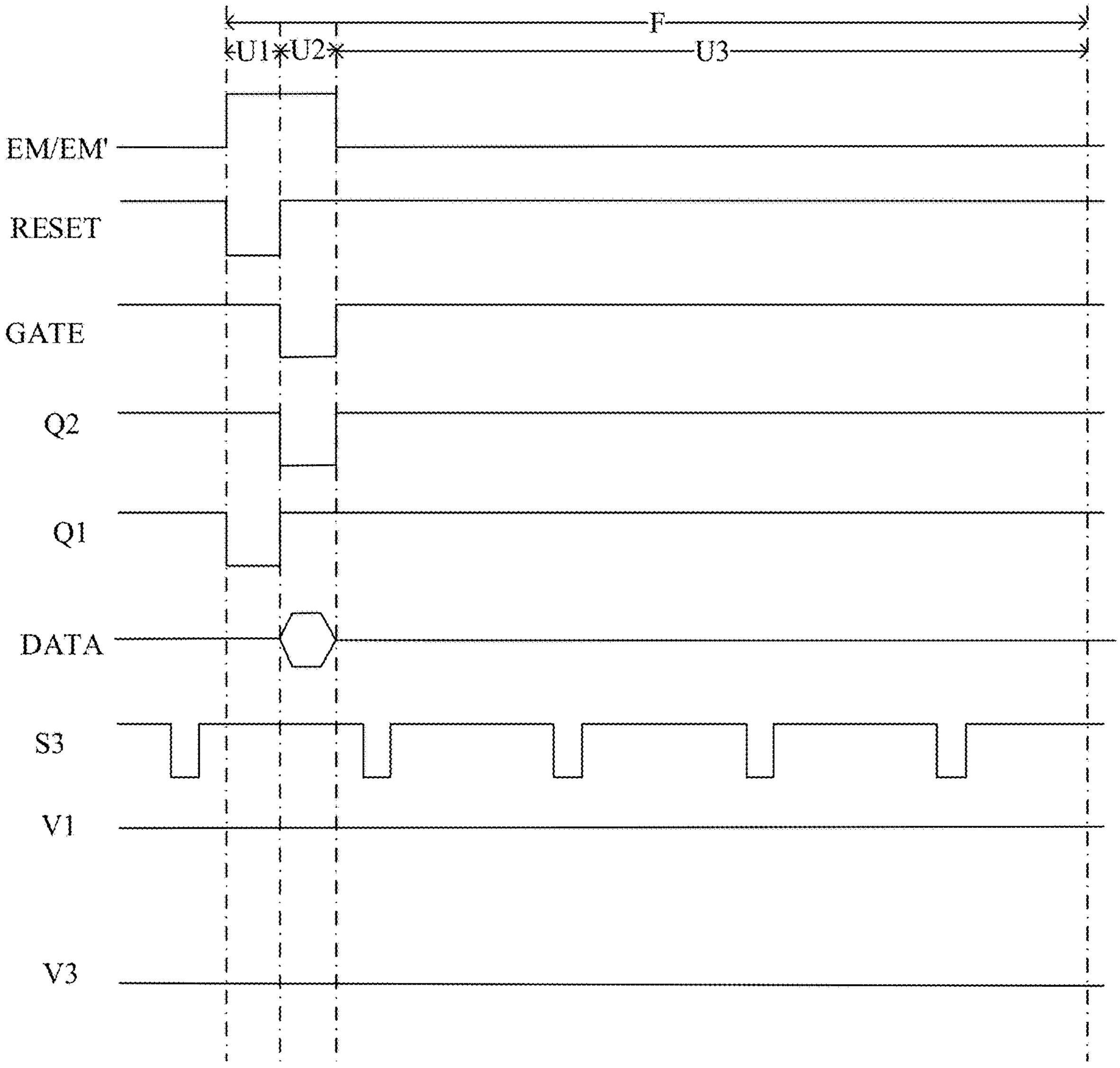
FIG. 9 is another timing diagram of signals for driving a pixel circuit, in accordance with some embodiments.

For example, in an image frame (F) as shown in FIG. 9, a timing of the first control signal received at the first control signal terminal Q1 is the same as a timing of the reset signal received at the reset signal terminal RESET. In this case, in the first period U1, the first input signal is written into the first control circuit, and the second input signal is not written into the first control circuit.

For example, a voltage amplitude of the first input signal matches a voltage amplitude of the first control signal and a voltage amplitude of the third input signal. That is, the first input signal and the first control signal need to ensure that transistors receiving these two signals are completely turned on and off, and the first input signal and the third input signal need to ensure that transistors receiving these two signals are completely turned on and off. For example, if the transistors are P-type transistors, in a case where a voltage of the first control signal is 10 V, a voltage of the first input signal is in a range from 7 V to 10 V; in a case where a voltage of the first control signal is −10 V, a voltage of the first input signal is in a range from −7 V to −10 V; and in a case where a voltage of the third input signal is −7 V, a voltage of the first input signal is in a range from −7 V to −10 V.

Correspondingly, a voltage amplitude of the second input signal matches a voltage amplitude of the second control signal and a voltage amplitude of the second enable signal. That is, the second input signal and the second control signal need to ensure that transistors receiving these two signals are completely turned on and off, and the second input signal and the second enable signal need to ensure that transistors receiving these two signals are completely turned on and off. For example, if the transistors are P-type transistors, in a case where a voltage of the second control signal is 10 V, a voltage of the second input signal is in a range from 7 V to 10 V; in a case where a voltage of the second control signal is −10 V, a voltage of the second input signal is in a range from −7 V to −10 V; and in a case where a voltage of the second enable signal is −7 V, a voltage of the second input signal is in a range from −7 V to −10 V.

In addition, in the first period U1, referring to FIGS. 6C and 6D, the thirteenth transistor T13 in the compensation sub-circuit 24 and the twelfth transistor T12 in the data writing sub-circuit 23 are turned off due to a high level of the scan signal at the scan signal terminal GATE, and the tenth transistor T10 and the eleventh transistor T11 in the driving control sub-circuit 22 is turned off due to a high level of the first enable signal at the first enable terminal EM. Therefore, the driving circuit 30, the first voltage terminal V1 and the element L to be driven do not form the conductive path.

In summary, in a case where the sub-pixel including the pixel circuit displays a low grayscale, in the first period, the first input signal is a low-level signal, and the second input signal is a high-level signal. In this case, the first control circuit 10 transmits the third input signal to the second control circuit 20. Although the second control circuit 20 is turned on due to a low level of the third input signal with high and low levels alternating, the driving circuit 30 does not output the driving signal to the element L to be driven; therefore, the element L to be driven does not operate. In a case where the sub-pixel including the pixel circuit displays a medium or high grayscale, in the first period, the first input signal is a high-level signal, and the second input signal is a low-level signal. In this case, the first control circuit 10 transmits the second enable signal to the second control circuit 20. The second control circuit 20 is turned off due to the high level of the second enable signal. In addition, the first control circuit 10 may also transmit the second voltage to the second control circuit 20 to control the second control circuit 20 to be turned off, so that the driving circuit 30 and the element L to be driven do not form the conductive path. Therefore, the element L to be driven does not operate.

In the second period (U2) in the image frame (F) as shown in FIG. 8, referring to FIGS. 5A and 5B, the data writing sub-circuit 23 in the driving circuit 30 writes the data signal received at the data signal terminal DATA into the driving sub-circuit 21, in response to the scan signal received at the scan signal terminal GATE. For example, referring to FIGS. 6A to 6D, the twelfth transistor T12 in the data writing sub-circuit 23 is turned on in response to a low level of the scan signal received at the scan signal terminal GATE, and writes the data signal received at the data signal terminal DATA into the driving sub-circuit 21, i.e., into the first electrode of the driving transistor DT.

The compensation sub-circuit 24 writes the data signal and the threshold voltage of the driving transistor DT into the control electrode of the driving transistor DT, in response to the scan signal received at the scan signal terminal GATE. For example, the thirteenth transistor T13 in the compensation sub-circuit 24 is turned on in response to the low level of the scan signal received at the scan signal terminal GATE, and connects the control electrode of the driving transistor DT to the second electrode of the driving transistor DT, so that the driving transistor DT is in a self-saturation state (or a diode conducting state). As a result, a voltage of the control electrode of the driving transistor DT is a sum of a voltage of the first electrode of the driving transistor DT and the threshold voltage of the driving transistor DT. That is, the data signal and the threshold voltage of the driving transistor DT are written into the control electrode of the driving transistor DT. In this case, the voltage $V_g$ of the control electrode of the driving transistor DT is a sum of a voltage $V_{data}$ of the data signal and the threshold voltage $V_{th}$ of the driving transistor DT (i.e., $V_g=V_{data}+V_{th}$).

In this case, a voltage of the second terminal of the fourth capacitor C4 coupled to the control electrode of the driving transistor DT is also equal to the sum of the voltage $V_{data}$ of the data signal and the threshold voltage $V_{th}$ of the driving transistor DT (i.e., $V_{data}+V_{th}$). The first terminal of the fourth capacitor C4 is coupled to the first voltage terminal V1, and a voltage of the first terminal of the fourth capacitor C4 is a first voltage $V_{DD}$. In this case, two terminals of the fourth capacitor C4 are charged, and a potential difference between the two terminals of the fourth capacitor C4 is a difference between the first voltage $V_{DD}$ and the sum of the voltage $V_{data}$ of the data signal and the threshold voltage $V_{th}$ of the driving transistor DT (i.e., $V_{DD}-V_{data}-V_{th}$).

In addition, since the first enable signal is at the high level in the second period, each transistor in the driving control sub-circuit 22 in the driving circuit 30 is in a turn-off state. For example, the tenth transistor T10 and the eleventh transistor T11 in the driving control sub-circuit 22 are in the turn-off state, and thus the tenth transistor T10 will not transmit the first voltage at the first voltage terminal V1 to the first electrode of the driving transistor DT. Therefore, the driving circuit 30, the first voltage terminal V1 and the element L to be driven do not form the conductive path.

Figure 10:
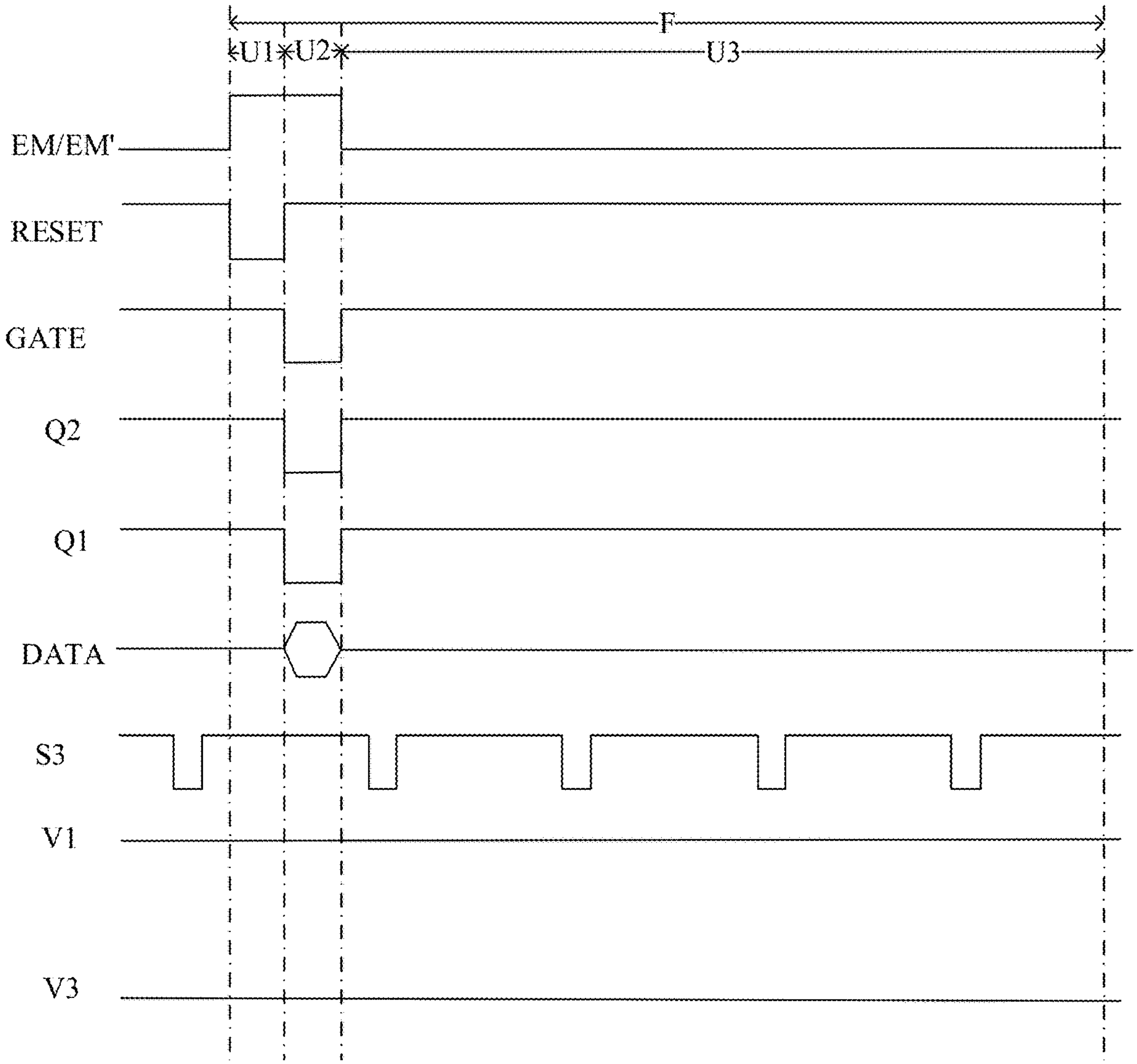
FIG. 10 is yet another timing diagram of signals for driving a pixel circuit, in accordance with some embodiments.

For example, in an image frame (F) as shown in FIG. 10, a timing of the first control signal received at the first control signal terminal Q1 and a timing of the second control signal received at the second control signal terminal Q2 are the same as a timing of the scan signal received at the scan signal terminal GATE. In this case, the first input signal and the second input signal are written into the first control circuit in the second period, and the first input signal and the second input signal are not written into the first control circuit in the first period.

It will be noted that, the operations of the sub-circuits in the first control circuit in a case where the first control signal and the second control signal are written into the first control circuit in the second period are similar to the operations of the sub-circuits in the first control circuit in a case where the first control signal and the second control signal are written into the first control circuit in the first period, reference may be made to the above description, and details will not be repeated here.

Based on this, in a case where the sub-pixel including the pixel circuit displays a low grayscale, in the second period, the first input signal is at the low level, and the second input signal is at the high level. In this case, the first control circuit 10 transmits the third input signal to the second control circuit 20. Although the second control circuit 20 is turned on due to the low level of the third input signal with high and low levels alternating, the driving circuit 30, the first voltage terminal V1 and the element L to be driven do not form the conductive path; therefore, the driving circuit 30 does not output the driving signal to the element L to be driven, and the element L to be driven does not operate. In a case where the sub-pixel including the pixel circuit displays a medium grayscale or high grayscale, in the second period, the first input signal is at the high level, and the second input signal is at the low level. In this case, the first control circuit 10 transmits the second enable signal to the second control circuit 20. The second control circuit 20 is turned off due to the high level of the second enable signal. In addition, the first control circuit 10 may also transmit the second voltage to the second control circuit 20 to control the second control circuit 20 to be turned off, so that the driving circuit 30 and the element L to be driven do not form the conductive path. As a result, the element L to be driven does not operate.

Moreover, in a case where the first control circuit 10 transmits the third input signal to the second control circuit 20, since the third input signal is a pulse signal, the voltage of the control electrode of the ninth transistor T9 in the second control circuit 20 will fluctuate, and accordingly, a voltage of the first electrode of the ninth transistor T9 will also fluctuate. In the pixel circuit 101 shown in FIGS. 6C and 6D, the eleventh transistor T11 in the driving control sub-circuit 22 in the driving circuit is in the turn-off state due to the high level of the first enable signal, so that the driving transistor DT is not connected to the ninth transistor T9 in the second control circuit 20. Therefore, it may prevent the ninth transistor T9 from affecting the voltage of the driving transistor DT, so as to ensure an accuracy of the written data signal.

In addition, in a case where the first electrode of the ninth transistor T9 is coupled to the second electrode of the driving transistor DT in the pixel circuit 101 shown in FIG. 6A, in the second period, referring to FIGS. 9 to 12, the third input signal is at the high level, so that the voltage of the control electrode of the ninth transistor T9 is a fixed voltage. In this way, it is possible to avoid a situation where the voltage of the second electrode of the driving transistor DT fluctuates due to an influence of the pulse signal of the third input signal on the voltage of the ninth transistor T9. For example, referring to FIGS. 9 to 12, in the first period and the second period, the third input signal and the first enable signal are both at the same level, e.g., the high level.

In the third period (U3) in the image frame (F) as shown in FIG. 8, referring to FIGS. 6A to 6D, the driving control sub-circuit 22 in the driving circuit 30 make the driving transistor DT in the driving sub-circuit 21, the first voltage terminal V1 and the second control circuit 20 form a conductive path, in response to the first enable signal received at the first enable signal terminal EM. For example, referring to FIG. 6A, the tenth transistor T10 in the driving control sub-circuit 22 is turned on in response to a low level of the first enable signal received at the first enable signal terminal EM, so that the first electrode of the driving transistor DT is coupled to the first voltage terminal V1 through the tenth transistor T10; and the second electrode of the driving transistor DT is coupled to the first electrode of the ninth transistor T9 in the second control circuit 20, so that the driving transistor DT in the driving sub-circuit 21, the first voltage terminal V1 and the second control circuit 20 form the conductive path. For example, referring to FIG. 6C, the tenth transistor T10 and the eleventh transistor T11 in the driving control sub-circuit 22 are turned on in response to the low level of the first enable signal received at the first enable signal terminal EM, so that the first electrode of the driving transistor DT is coupled to the first voltage terminal V1 through the tenth transistor T10, and the second electrode of the driving transistor DT is coupled to the first electrode of the ninth transistor T9 in the second control circuit 20 through the eleventh transistor T11. Therefore, the driving transistor DT in the driving sub-circuit 21, the first voltage terminal V1 and the second control circuit 20 form the conductive path. In this case, the voltage of the first electrode of the driving transistor DT is the first voltage.

In this case, the driving sub-circuit 21 generates a driving signal according to the written data signal and the first voltage at the first voltage terminal V1. According to the law of conservation of charge, a potential difference between the first terminal and the second terminal of the fourth capacitor C4 in the driving sub-circuit 21 remains unchanged; in a case where the voltage of the first terminal of the fourth capacitor C4 is maintained at the first voltage, the voltage of the second terminal of the fourth capacitor C4 is still $(V_{data}+V_{th})$. In this case, the voltage of the control electrode of the driving transistor DT is $(V_{data}+V_{th})$.

It can be understood that, in a case where a gate-source voltage difference of the driving transistor DT is less than or equal to the threshold voltage $V_{th}$ of the driving transistor DT, the driving transistor DT is turned on and generates a driving signal, and the driving signal is output from the second electrode of the driving transistor DT. Since the voltage of the control electrode of the driving transistor DT is $(V_{data}+V_{th})$, and the voltage of the first electrode of the driving transistor DT is the first voltage $V_{DD}$, the gate-source voltage difference $V_{gs}$ of the driving transistor DT is the difference between $(V_{data}+V_{th})$ and $V_{DD}$ $(V_{gs}=V_{data}+V_{th}-V_{DD})$. Therefore, a driving current I passing through the driving transistor DT is that $I=½×K×(V_{gs}-V_{th})\ 2=½×K×(V_{data}+V_{th}-V_{DD}-V_{th})\ 2=½×K×(V_{data}-V_{DD})^2$, and the driving current I is used as the driving signal generated by the driving sub-circuit 21. Here, K=W/L×C×u, W/L is a width-to-length ratio of the driving transistor DT, C is a capacitance of a channel insulating layer of the driving transistor DT, and u is a channel carrier mobility of the driving transistor DT.

It can be understood that, the driving signal generated by the driving circuit 10 is related to the data signal and the first voltage, and is unrelated to the threshold voltage of the driving transistor DT, so that compensation for the threshold voltage of the driving transistor in the driving circuit is realized. As a result, an influence of the threshold voltage of the driving transistor DT on the operation (e.g., the brightness) of the element L to be driven is avoided, and a uniformity of the brightness of the element L to be driven is improved.

It will be noted that, a magnitude of the driving current (i.e., the driving signal) is related to the properties of the driving transistor. For pixel circuits that provide driving signals to elements to be driven in sub-pixels of different colors (e.g., red sub-pixels, green sub-pixels, and blue sub-pixels), there is a need to take photoelectric properties of elements to be driven into consideration, and different driving capabilities may be achieved by designing sizes of driving transistors. For example, for a driving transistor of a pixel circuit that provides a driving signal to an element to be driven in the red sub-pixel, a driving transistor of a pixel circuit that provides a driving signal to an element to be driven in the green sub-pixel, and a driving transistor of a pixel circuit that provides a driving signal to an element to be driven in the blue sub-pixel, width-to-length ratios of at least two driving transistors are different. Therefore, in a case where sub-pixels of different colors all display the same grayscale, theoretically, if sizes of driving transistors in pixel circuits that provide driving signals to elements to be driven in the sub-pixels of different colors are exactly the same, magnitudes of driving signals required by different sub-pixels may be different; if amplitudes of data signals provided to pixel circuits in different sub-pixels are different, the design complexity may be greatly increased. However, by designing the size of the driving transistor in each pixel circuit, e.g., changing the width-to-length ratio of the driving transistor to adjust the magnitude of the driving signal, data signals with the same amplitude may be provided to different sub-pixels.

In a case where the sub-pixels including the pixel circuits display different grayscales, the first voltage at the first voltage terminal V1 is a DC voltage, and the magnitude of the driving signal may be changed by controlling the voltage $V_{data}$ of the data signal, so that the magnitude of the driving signal is maintained in a relatively high value range, and the luminous efficiency of the element L to be driven is improved. As a result, a problem of low luminous efficiency and high power consumption of the element L to be driven in a case where a small current is used to achieve the low grayscale display is avoided, thereby improving the display effect of the display panel.

When the driving circuit 30 outputs the driving signal to the second control circuit 20, the first electrode of the ninth transistor T9 in the second control circuit 20 receives the driving signal.

For example, in a case where the sub-pixel including the pixel circuit displays the low grayscale, the second input signal written into the first control circuit 10 is the high-level signal, and the first input signal written into the first control circuit 10 is the low-level signal.

Referring to FIG. 5A, the first input sub-circuit 11A in the first control circuit 10 transmits the third input signal received at the third input signal terminal S3 to the second control circuit 20 in response to the first input signal.

Referring to FIG. 5B, the first input sub-circuit 11B in the first control circuit 10 transmits the third input signal to the voltage stabilizing sub-circuit 12 in response to the first input signal, and the voltage stabilizing sub-circuit 12 transmits the third input signal to the second control circuit 20 in response to the first enable signal received at the first enable signal terminal EM.

For example, referring to FIGS. 6A to 6D, the third capacitor C3 in the second input sub-circuit 13 stores the high-level second input signal, and the eighth transistor T8 in the second input sub-circuit 13 is turned off due to the high-level second input signal, and will not transmit the second enable signal received at the second enable signal terminal EM' to the second control circuit 20.

For example, referring to FIG. 6B, the fourth transistor T4 in the first input sub-circuit 11B is turned on in response to the low-level first input signal, the fifth transistor T5 in the voltage stabilizing sub-circuit 12 is turned on in response to the low level of the first enable signal received at the first enable signal terminal EM, and thus the fourth transistor T4 and the fifth transistor T5 transmit the third input signal received at the third input signal terminal S3 to the second control circuit 20.

For example, referring to FIG. 6A, the first capacitor C1 in the first input sub-circuit 11A stores the low-level first input signal; and the second transistor T2 is turned on in response to the low-level first input signal, and transmits the third input signal received at the third input signal terminal S3 to the second control circuit 20.

Therefore, in a case where the sub-pixel including the pixel circuit displays the low grayscale, the first control circuit 10 transmits the third input signal to the second control circuit 20. In the third period, the third input signal is a pulse signal with high and low levels alternating. In a case where the third input signal is at the low level, the ninth transistor T9 in the second control circuit 20 is turned on in response to the low level of the third input signal from the first control circuit 10; thus, the driving circuit 30 and the element L to be driven form a conductive path, and the second control circuit 20 transmits the driving signal from the driving circuit 30 to the element L to be driven, so as to drive the element L to be driven to operate. In a case where the third input signal is at the high level, the ninth transistor T9 in the second control circuit 20 is turned off; thus, the driving circuit 30 and the element L to be driven do not form the conductive path, the driving signal is not transmitted to the element L to be driven, and the element L to be driven does not operate. Therefore, an operating state and a non-operating state of the element L to be driven alternate, and the element L to be driven is in a bright and dark alternating light-emitting state in a case where the operating state of the element L to be driven is a light-emitting state.

Therefore, in a case where the sub-pixel including the pixel circuit displays the low grayscale, the first control circuit transmits the third input signal to the second control circuit, and a frequency at which the second control circuit 20 is turned on is controlled by the third input signal, so as to control a frequency at which the driving circuit 30 and the element L to be driven form the conductive path, and then control a frequency of receiving the driving signal by the element L to be driven. As a result, the element to be driven is intermittently in the operating state, and the operating duration of the element L to be driven is controlled; and the element to be driven may also achieve corresponding gray-scale display under the driving signal with a relatively high amplitude, which improves the operating efficiency of the element to be driven. In addition, the operating frequency of the element to be driven is relatively high, which may prevent the human eyes from viewing the flicker, thereby improving the display effect.

In a case where the grayscale displayed by the sub-pixel is the medium grayscale or the high grayscale, the written second input signal is the low-level signal, and the written first input signal is the high-level signal.

Referring to FIGS. 5A and 5B, the second input sub-circuit 13 in the first control circuit 10 transmits the second enable signal received at the second enable signal terminal EM' to the second control circuit 20 in response to the second input signal.

For example, referring to FIG. 6A, the first capacitor C1 in the first input sub-circuit 11A stores the high-level first input signal, and the second transistor T2 is turned off due to the high-level first input signal, and will not transmit the third input signal received at the third input signal terminal S3 to the second control circuit 20.

For example, referring to FIG. 6B, the first capacitor C1 in the first input sub-circuit 11B stores the high-level first input signal, and the fourth transistor T4 is turned off due to the high-level first input signal; the fifth transistor T5 in the voltage stabilizing sub-circuit 12 is turned on in response to the low level of the first enable signal received at the first enable signal terminal EM, and thus the third input signal received at the third input signal terminal S3 is not transmitted to the second control circuit 20.

For example, referring to FIGS. 6A to 6C, the third capacitor C3 in the second input sub-circuit 13 stores the low level second input signal, and the eighth transistor T8 in the second input sub-circuit 13 is turned on in response to the low-level second input signal, and transmits a low level of the second enable signal received at the second enable signal terminal EM' to the second control circuit 20. The ninth transistor T9 in the second control circuit 20 is turned on in response to the low level of the second enable signal, so that the driving circuit 30 and the element L to be driven form the conductive path. In this case, the driving signal from the driving circuit 30 is transmitted to the element L to be driven through the second control circuit 20, so as to drive the element L to be driven to operate.

In the third period, the first transistor T1 in the first input sub-circuit 11A is turned off due to a high level of the first control signal received at the first control signal terminal Q1, the sixth transistor T6 in the voltage stabilizing sub-circuit 12 is turned off due to a high level of the third control signal received at the third control signal terminal Q3 (referring to FIG. 11), and the seventh transistor T7 in the second input sub-circuit 13 is turned off due to a high level of the second control signal received at the second control signal terminal Q2.

In the third period, since the second enable signal is at the low level, the ninth transistor T9 in the second control circuit 20 is in a turn-on state all the time, and the driving signal from the driving circuit 30 may be transmitted to the element L to be driven all the time. Therefore, the element L to be driven is operating all the time. In this way, in a case where the driving signal is a high current signal, the brightness of the element L to be driven may be ensured, which ensures the operating efficiency of the element to be driven.

Figure 13:
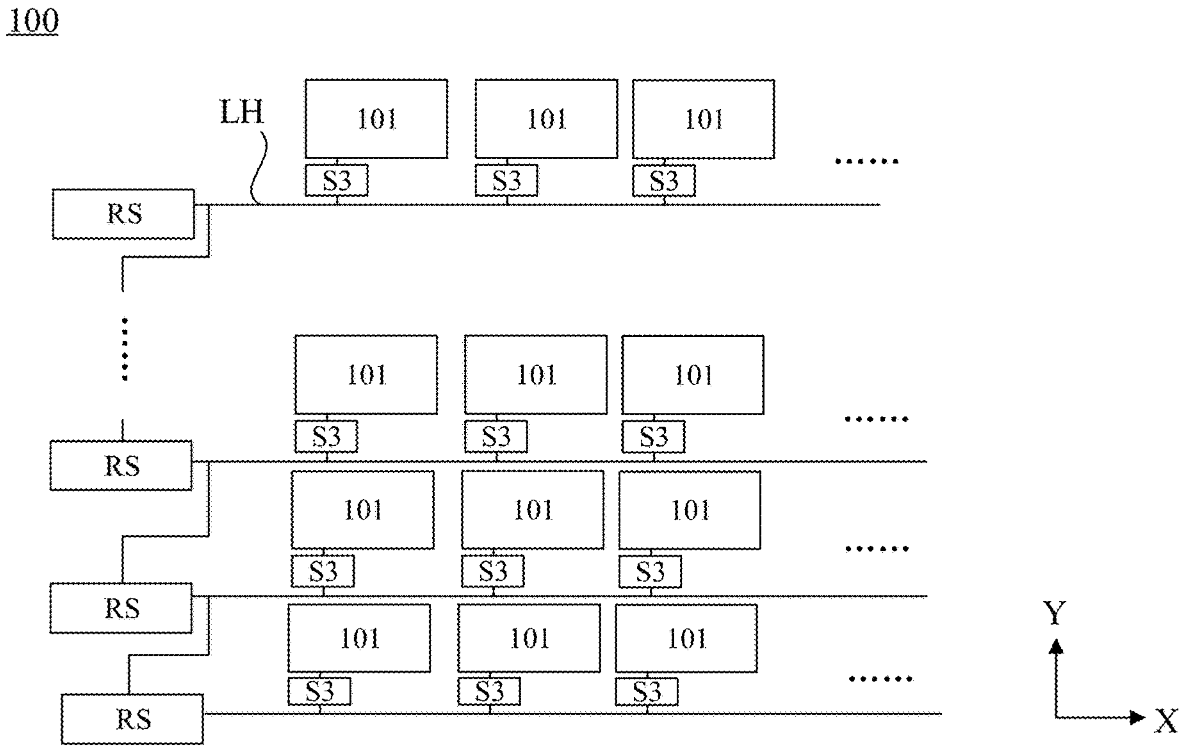
FIG. 13 is a structural diagram of yet another display panel, in accordance with some embodiments.

In some embodiments, as shown in FIG. 13, the display panel 100 further includes a plurality of shift register circuits RS that are connected in cascade. Each shift register circuit is coupled to third input signal terminals S3 that are coupled to a row of pixel circuits 101. For example, each shift register circuit RS is coupled to the third input signal terminals S3 that are coupled to the row of pixel circuits 101 through an input signal line LH. The shift register circuit RS is configured to transmit the third input signal to the third input signal terminals S3 coupled to the shift register circuit RS.

For example, in the non-operating period of the element to be driven, the third input signal and the first enable signal are at the same level. For example, referring to FIG. 12, in the non-operating period of the element to be driven, i.e., the first period U1 and the second period U2 in FIG. 12, the first enable signal is at a high level, and the third input signal is also at a high level.

Figure 14:
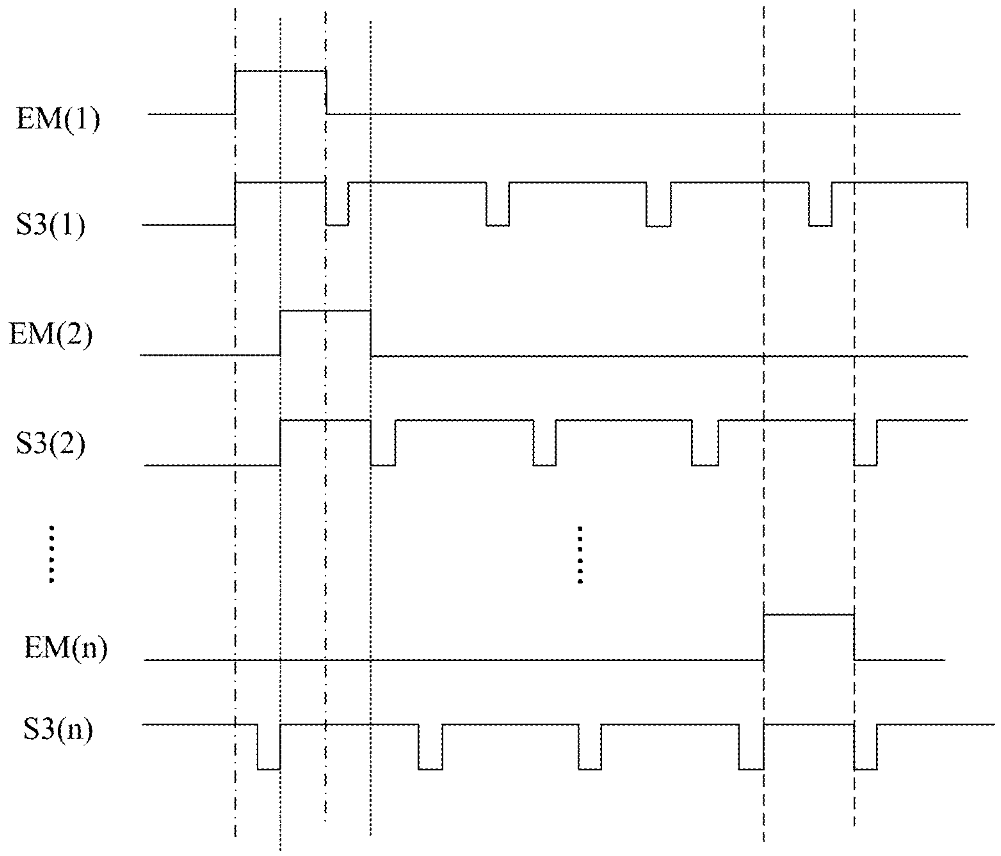
FIG. 14 is yet another timing diagram of signals for driving a pixel circuit, in accordance with some embodiments.

For example, the plurality of shift register circuits that are connected in cascade may sequentially transmit third input signals to respective pixel circuits. For example, the third input signals received by pixel circuits in rows of sub-pixels at third input signal terminals S3 are sequentially shifted row by row as first enable signals received by the pixel circuits in the rows of sub-pixels at first enable signal terminals EM are sequentially shifted row by row. For example, in a case where the display panel has n rows of sub-pixels, n being a positive integer, referring to FIG. 14, when a first enable signal EM(1) received by a first row of pixel circuits is at a high level, a third input signal S3(1) received by the first row of pixel circuits is also at a high level; when a first enable signal EM(2) received by a second row of pixel circuits is at a high level, a third input signal S3(2) received by the second row of pixel circuits is also at a high level; and so on, when a first enable signal EM(n) received by an n-th row of pixel circuits is at a high level, a third input signal S3(n) received by the n-th row of pixel circuits is also at a high level.

It will be noted that, a specific circuit structure of the shift register circuit may be selected according to actual situations, which is not limited here, as long as a circuit and device capable of implementing the above functions may all be used as the shift register circuit in the embodiments of the present disclosure.

In some embodiments, the display panel includes a plurality of scan driving circuits. The plurality of scan driving circuits include at least three scan driving circuits, and the at least three scan driving circuits include a first scan driving circuit, a second scan driving circuit and a third scan driving circuit. For example, each scan driving circuit includes shift register circuits connected in cascade. The first scan driving circuit is configured to output scan signals, the second scan driving circuit is configured to output reset signals, and the third scan driving circuit is configured to output enable signals, such as first enable signals and second enable signals.

In some embodiments, the plurality of scan driving circuits include at least four scan driving circuits, and the at least four scan driving circuits include: the first scan driving circuit, the second scan driving circuit, the third scan driving circuit, and a fourth scan driving circuit. The fourth scan driving circuit is configured to output the third input signals. For example, the fourth scan driving circuit includes the shift register circuits RS connected in cascade described above. For example, shift register circuits in different scan driving circuits are not completely the same. For example, the shift register circuits in the fourth scan driving circuit are different from the shift register circuits in the first scan driving circuit, the shift register circuits in the second scan driving circuit, and the shift register circuits in the third scan driving circuit.

For example, in the first scan driving circuit, the second scan driving circuit, the third scan driving circuit and the fourth scan driving circuit, two scan driving circuits are located on one of two opposite sides of the display area AA, and the other two scan driving circuits are located on the other of the two opposite sides of the display area AA. For example, the two opposite sides of the display area AA may be two opposite sides of the display area AA in a direction in which pixel circuits are arranged in a row. For example, the first scan driving circuit and the second scan driving circuit are located on one of the two opposite sides of the display area AA, and the third scan driving circuit and the fourth scan driving circuit are located on the other of the two opposite sides of the display area AA. In this way, a distribution of the circuits in the display panel is uniform, so that thicknesses of layers of the display panel are uniform.

In some embodiments, as shown in FIG. 1, the display apparatus 200 further includes driving chip(s) 210 coupled to the display panel 100 and configured to provide signals to the display panel 100. For example, the driving chip is a driving integrated circuit (IC).

For example, there is one driving chip 210, which may provide data signals to the display panel 100; and the one driving chip 210 may further provide first input signals, second input signals and third input signals to the display panel 100. Alternatively, there are a plurality of driving chips 210 included in the display apparatus 200, and the plurality of driving chips provide the data signals, the first input signals, the second input signals, and the third input signals to the display panel 100.

For example, in a case where the third input signals are provided by the driving chip, the third input signals received by all the pixel circuits in the display panel are the same, thereby simplifying the design of the display apparatus.

In a case where the third input signals are provided by the shift register circuit, the pixel circuits in a row receive the same third input signal. In this way, the voltage of the third input signal is adjusted according to the actual operation of the pixel circuit. For example, for the pixel circuit in FIG. 6B, the third input signal does not need to maintain at a high level in the first period and the second period, which may reduce power consumption of the display apparatus.

Embodiments of the present disclosure provide a driving method of a pixel circuit. The pixel circuit includes a driving circuit, a first control circuit, and a second control circuit. The driving circuit is coupled to at least a data signal terminal, a scan signal terminal, a first voltage terminal and a first enable signal terminal. The first control circuit is coupled to at least a second enable signal terminal, a first control signal terminal, a first input signal terminal, a second control signal terminal, a second input signal terminal and a third input signal terminal. The second control circuit is coupled to the driving circuit, the first control circuit and an element to be driven.

The driving method of the pixel circuit includes:

receiving, by the driving circuit, a data signal received at the data signal terminal in response to a scan signal received at the scan signal terminal; and generating, by the driving circuit, a driving signal according to a first voltage at the first voltage terminal V1 and the data signal, in response to a first enable signal received at the first enable signal terminal;

receiving, by the first control circuit, a first input signal received at the first input signal terminal in response to a first control signal received at the first control signal terminal, and transmitting, by the first control circuit, a third input signal received at the third input signal terminal in response to the first input signal; or, receiving, by the first control circuit, a second input signal received at the second input signal terminal in response to a second control signal received at the second control signal terminal, and transmitting, by the first control circuit, a second enable signal received at the second enable signal terminal in response to the second input signal; and receiving, by the second control circuit, one of the third input signal and the second enable signal, and transmitting, by the second control circuit, the driving signal from the driving circuit to the element to be driven in response to the one of the third input signal and the second enable signal, so as to control an operating duration of the element to be driven.

A frequency of the third input signal is greater than a frequency of the second enable signal.

For example, in a case where a sub-pixel where the pixel circuit is located displays a medium or high grayscale, the first control circuit transmits the third input signal to the second control circuit. In this case, for example, the first input signal is a high-level signal, and the second input signal is a low-level signal. In a case where the sub-pixel where the pixel circuit is located displays a low grayscale, the first control circuit transmits the second enable signal to the second control circuit. In this case, for example, the first input signal is a low-level signal, and the second input signal is a high-level signal.

The driving method of the pixel circuit has the same beneficial effects as the pixel circuit described above, and details will not be repeated here.

The foregoing descriptions are merely specific implementations of the present disclosure, but the protection scope of the present disclosure is not limited thereto. Changes or replacements that a person skilled in the art could conceive of within the technical scope of the present disclosure, which shall be included in the protection scope of the present disclosure. Therefore, the protection scope of the present disclosure shall be subject to the protection scope of the claims.

What is claimed is:

1. A pixel circuit, comprising:

a driving circuit coupled to at least a data signal terminal, a scan signal terminal, a first voltage terminal and a first enable signal terminal, the driving circuit being configured to: receive a data signal received at the data signal terminal, in response to a scan signal received at the scan signal terminal; and generate, in response to a first enable signal received at the first enable signal terminal, a driving signal according to a first voltage at the first voltage terminal and the data signal;

a first control circuit coupled to at least a second enable signal terminal, a first control signal terminal, a first input signal terminal, a second control signal terminal, a second input signal terminal and a third input signal terminal, the first control circuit being configured to: receive a first input signal received at the first input signal terminal in response to a first control signal received at the first control signal terminal, and transmit a third input signal received at the third input signal terminal in response to the first input signal; and receive a second input signal received at the second input signal terminal in response to a second control signal received at the second control signal terminal, and transmit a second enable signal received at the second enable signal terminal in response to the second input signal; and a second control circuit coupled to the driving circuit and the first control circuit, and configured to be coupled to an element to be driven, the second control circuit being further configured to receive one of the third input signal and the second enable signal, and transmit the driving signal from the driving circuit to the element to be driven in response to the one of the third input signal and the second enable signal, so as to control operation of the element to be driven; wherein the first input signal terminal and the second input signal terminal are configured to be coupled to a same signal line, and the same signal line is configured to transmit signals with different amplitudes to the first input signal terminal and the second input signal terminal.

2. The pixel circuit according to claim 1, wherein the second enable signal terminal and the first enable signal terminal are configured to be coupled to a same enable signal line; or the second enable signal terminal and the first enable signal terminal are configured to be coupled to different enable signal lines.

3. The pixel circuit according to claim 1, wherein the first control circuit includes a first input sub-circuit coupled to the first control signal terminal, the first input signal terminal and the third input signal terminal, wherein the first input sub-circuit is configured to receive the first input signal received at the first input signal terminal in response to the first control signal received at the first control signal terminal, and transmit the third input signal received at the third input signal terminal to the second control circuit in response to the first input signal.

4. The pixel circuit according to claim 3, wherein the first control circuit is further coupled to a third control signal terminal, the first enable signal terminal and a second voltage terminal; and the first control circuit is further configured to transmit a second voltage at the second voltage terminal to the second control circuit in response to a third control signal received at the third control signal terminal, and the first control circuit being configured to transmit the third input signal in response to the first input signal includes: the first control circuit being configured to transmit the third input signal to the second control circuit in response to the first enable signal received at the first enable signal terminal and the first input signal.

5. The pixel circuit according to claim 4, wherein the first control circuit further includes a voltage stabilizing sub-circuit coupled to the first enable signal terminal, the first input sub-circuit, the second control circuit, the third control signal terminal and the second voltage terminal, wherein the voltage stabilizing sub-circuit is configured to transmit the second voltage at the second voltage terminal to the second control circuit in response to the third control signal received at the third control signal terminal, and transmit the third input signal from the first input sub-circuit to the second control circuit in response to the first enable signal received at the first enable signal terminal.

6. The pixel circuit according to claim 5, wherein the first input sub-circuit includes:

a third transistor, a control electrode of the third transistor being coupled to the first control signal terminal, and a first electrode of the third transistor being coupled to the first input signal terminal; and a fourth transistor, a control electrode of the fourth transistor being coupled to a second electrode of the third transistor, a first electrode of the fourth transistor being coupled to the third input signal terminal, and a second electrode of the fourth transistor being coupled to the voltage stabilizing sub-circuit; and the voltage stabilizing sub-circuit includes:

a fifth transistor, a control electrode of the fifth transistor being coupled to the first enable signal terminal, a first electrode of the fifth transistor being coupled to the first input sub-circuit, and a second electrode of the fifth transistor being coupled to the second control circuit; and a sixth transistor, a control electrode of the sixth transistor being coupled to the third control signal terminal, a first electrode of the sixth transistor being coupled to the second voltage terminal, and a second electrode of the sixth transistor being coupled to the second control circuit.

7. The pixel circuit according to claim 3, wherein the first input sub-circuit is further coupled to the second control circuit; and the first input sub-circuit includes:

a first transistor, a control electrode of the first transistor being coupled to the first control signal terminal, and a first electrode of the first transistor being coupled to the first input signal terminal; and a second transistor, a control electrode of the second transistor being coupled to a second electrode of the first transistor, a first electrode of the second transistor being coupled to the third input signal terminal, and a second electrode of the second transistor being coupled to the second control circuit.

8. The pixel circuit according to claim 3, wherein the first control circuit further includes a second input sub-circuit coupled to the second control signal terminal, the second input signal terminal, the second enable signal terminal and the second control circuit, the second input sub-circuit being configured to receive the second input signal received at the second input signal terminal in response to the second control signal received at the second control signal terminal, and transmit the second enable signal received at the second enable signal terminal to the second control circuit in response to the second input signal.

9. The pixel circuit according to claim 8, wherein the second input sub-circuit includes:

a seventh transistor, a control electrode of the seventh transistor being coupled to the second control signal terminal, and a first electrode of the seventh transistor being coupled to the second input signal terminal; and an eighth transistor, a control electrode of the eighth transistor being coupled to a second electrode of the seventh transistor, a first electrode of the eighth transistor being coupled to the second enable signal terminal, and a second electrode of the eighth transistor being coupled to the second control circuit.

10. The pixel circuit according to claim 1, wherein the second control circuit includes a ninth transistor, a control electrode of the ninth transistor being coupled to the first control circuit, a first electrode of the ninth transistor being coupled to the driving circuit, and a second electrode of the ninth transistor being configured to be coupled to the element to be driven.

11. The pixel circuit according to claim 1, wherein the driving circuit includes:

a driving sub-circuit including a driving transistor and a fourth capacitor, a first terminal of the fourth capacitor being coupled to the first voltage terminal, and a second terminal of the fourth capacitor being coupled to a control electrode of the driving transistor;

a driving control sub-circuit coupled to at least the first enable signal terminal, the first voltage terminal and the driving transistor, the driving control sub-circuit being configured to make the first voltage terminal and the second control circuit form a conductive path through the driving transistor in the driving sub-circuit in response to the first enable signal received at the first enable signal terminal;

a data writing sub-circuit coupled to the scan signal terminal, the data signal terminal and a first electrode of the driving transistor, the data writing sub-circuit being configured to write the data signal received at the data signal terminal into the first electrode of the driving transistor in response to the scan signal received at the scan signal terminal; and a compensation sub-circuit coupled to the scan signal terminal, the control electrode of the driving transistor and a second electrode of the driving transistor, the compensation sub-circuit being configured to write the data signal and a threshold voltage of the driving transistor into the control electrode of the driving transistor in response to the scan signal received at the scan signal terminal, wherein the driving sub-circuit is configured to generate a driving signal according to the data signal and the first voltage at the first voltage terminal.

12. The pixel circuit according to claim 11, wherein the driving control sub-circuit includes a tenth transistor, a control electrode of the tenth transistor being coupled to the first enable signal terminal, a first electrode of the tenth transistor being coupled to the first voltage terminal, and a second electrode of the tenth transistor being coupled to the first electrode of the driving transistor, wherein the second electrode of the driving transistor is coupled to the second control circuit.

13. The pixel circuit according to claim 11, wherein the driving control sub-circuit includes:

a tenth transistor, a control electrode of the tenth transistor being coupled to the first enable signal terminal, a first electrode of the tenth transistor being coupled to the first voltage terminal, and a second electrode of the tenth transistor being coupled to the first electrode of the driving transistor; and an eleventh transistor, a control electrode of the eleventh transistor being coupled to the first enable signal terminal, a first electrode of the eleventh transistor being coupled to the second electrode of the driving transistor, and a second electrode of the eleventh transistor being coupled to the second control circuit.

14. The pixel circuit according to claim 11, wherein the data writing sub-circuit includes a twelfth transistor, a control electrode of the twelfth transistor being coupled to the scan signal terminal, a first electrode of the twelfth transistor being coupled to the data signal terminal, and a second electrode of the twelfth transistor being coupled to the first electrode of the driving transistor; and/or the compensation sub-circuit includes a thirteenth transistor, a control electrode of the thirteenth transistor being coupled to the scan signal terminal, a first electrode of the thirteenth transistor being coupled to the second electrode of the driving transistor, and a second electrode of the thirteenth transistor being coupled to the control electrode of the driving transistor.

15. The pixel circuit according to claim 11, wherein the driving circuit further includes a reset sub-circuit coupled to the driving sub-circuit, a reset signal terminal and an initial signal terminal, and configured to be coupled to the element to be driven, wherein the reset sub-circuit is further configured to transmit an initial signal received at the initial signal terminal to the driving sub-circuit and the element to be driven in response to a reset signal received at the reset signal terminal.

16. The pixel circuit according to claim 15, wherein the first control signal terminal and the reset signal terminal are configured to be coupled to a same signal line, and the second control signal terminal and the scan signal terminal are configured to be coupled to a same signal line; or the first control signal terminal and the scan signal terminal are configured to be coupled to a same signal line, and the second control signal terminal and the reset signal terminal are configured to be coupled to a same signal line.

17. A display panel, comprising:

pixel circuits according to claim 1; and elements to be driven coupled to the pixel circuits.

18. The display panel according to claim 17, further comprising: a plurality of first signal lines and a plurality of second signal lines, wherein first control signal terminals and second control signal terminals that are coupled to a row of pixel circuits are coupled to two first signal lines, the first control signal terminals and the second control signal terminals are coupled to different first signal lines, and first input signal terminals and second input signal terminals that are coupled to a column of pixel circuits are coupled to a same second signal line.

19. The display panel according to claim 17, further comprising a plurality of shift register circuits connected in cascade, wherein each shift register circuit is coupled to third input signal terminals that are coupled to a row of pixel circuits, and the shift register circuit is configured to transmit the third input signal to the third input signal terminals of the pixel circuits coupled to the shift register circuit.

20. A display apparatus, comprising:

the display panel according to claim 17; and a driving chip coupled to the display panel, the driving chip being configured to provide signals to the display panel.

* * * * *